(12) United States Patent
Marvasti et al.

(10) Patent No.: US 11,055,382 B2
(45) Date of Patent: Jul. 6, 2021

(54) METHODS AND SYSTEMS THAT ESTIMATE A DEGREE OF ABNORMALITY OF A COMPLEX SYSTEM

(71) Applicant: VMware, Inc., Palo Alto, CA (US)

(72) Inventors: Mazda A. Marvasti, Coto de Caza, CA (US); Ashot Nshan Harutyunyan, Yerevan (AM); Naira Movses Grigoryan, Yerevan (AM); Arnak Poghosyan, Yerevan (AM)

(73) Assignee: VMware, Inc., Palo Alto, CA (US)

( * ) Notice: Subject to any disclaimer, the term of this patent is extended or adjusted under 35 U.S.C. 154(b) by 874 days.

(21) Appl. No.: 14/701,217

(22) Filed: Apr. 30, 2015

(65) Prior Publication Data

US 2016/0321553 A1    Nov. 3, 2016

(51) Int. Cl.
*G06F 17/18* (2006.01)
*G06K 9/00* (2006.01)

(52) U.S. Cl.
CPC ............... *G06F 17/18* (2013.01); *G06K 9/00* (2013.01)

(58) Field of Classification Search
CPC ...................................................... G06N 5/048
See application file for complete search history.

(56) References Cited

U.S. PATENT DOCUMENTS 6,216,109 B1 * 4/2001 Zweben ................. G06Q 10/04
                                                        705/7.12

* cited by examiner

*Primary Examiner* — Yu-Shi D Sun

(57) ABSTRACT

Methods and systems that estimate a degree of abnormality of a complex system based on historical time-series data representative of the complex system's past behavior and using the historical degree of abnormality to determine whether or not a degree of abnormality determined from current time-series data representative of the same complex system's current behavior is worthy of attention. The time-series data may be metric data that represents behavior of a complex system as a result of successive measurements of the complex system made over time or in a time interval. A degree of abnormality represents the amount by which the time-series data violates a threshold. The larger the degree of abnormality of the current time-series data is from the historical degree of abnormality, the larger the violation of the thresholds and the greater the probability the violation in the current time-series data is worthy of attention.

22 Claims, 25 Drawing Sheets

METHODS AND SYSTEMS THAT ESTIMATE A DEGREE OF ABNORMALITY OF A COMPLEX SYSTEM

TECHNICAL FIELD

The present disclosure is directed to automated management tools of data-generating entities, and in particular, to methods and systems that estimate abnormalities in time-series data.

BACKGROUND

With the advent of increased computing power and data storage, the development of computational tools to study ever increasingly complex systems in detail has increased. Examples of complex systems include weather systems, ecosystems, biological systems, business operations, information technology, systems monitored by one or more sensors, and cloud computing systems just to name a few. Of particular importance to those who study these complex systems is the ability to identify abnormalities that occur within these complex systems from time-series data generated by the complex system itself or by sensors used to monitor the complex system. For example, in the case of a data center, variations from normal or expected computational operations could lead to failures, slowdown, and other problems. These types of problems are often triggered by unobserved abnormalities in the operation of processes or computational resources that may cascade into larger problems. However, monitoring such complex systems generates vast amounts of time-series data that is collected, analyzed, and presented for human understanding. Those working with complex systems seek methods and systems that may be used to identify out-of-control abnormalities of a complex system from time-series data.

SUMMARY

Methods and systems described herein are directed to estimating a degree of abnormality of a complex system based on historical time-series data representative of the complex system's past behavior and using the historical degree of abnormality to determine whether or not a degree of abnormality determined from current time-series data representative of the same complex system's current behavior is worthy of attention. The time-series data may be metric data that represents behavior of a complex system as a result of successive measurements of the complex system made over time or in a time interval. For example, the complex system may be the earth and a seismometer that measures ground motion generates a signal composed of time-sampled data that represents the motion of the earth. If the complex system is a processor, the processor may generate time-series data that represents the amount of the processor in use at regular points in time. If the complex system is a virtual machine, the virtual machine may include instructions to generate a number of different types of time-series data, each time series may represent usage of a different virtual machine component. A degree of abnormality represents the amount by which the time-series data violates a threshold. The premise behind the methods and systems is that time-series data often violates thresholds for certain periods of time, but not all of these violations are worthy of attention, such as generating an alert. Methods and systems compare current violations in time-series data with violations of thresholds in historical time-series data and identify out-of-control processes based on comparisons between calculated degrees of abnormality for the historical time-series data and for the current time-series data. The larger the degree of abnormality of the current time-series data is from the historical degree of abnormality of the historical time-series data, the larger the violation of the thresholds and the greater the probability the violation in the current time-series data is worthy of attention.

DETAILED DESCRIPTION

Figure 1:
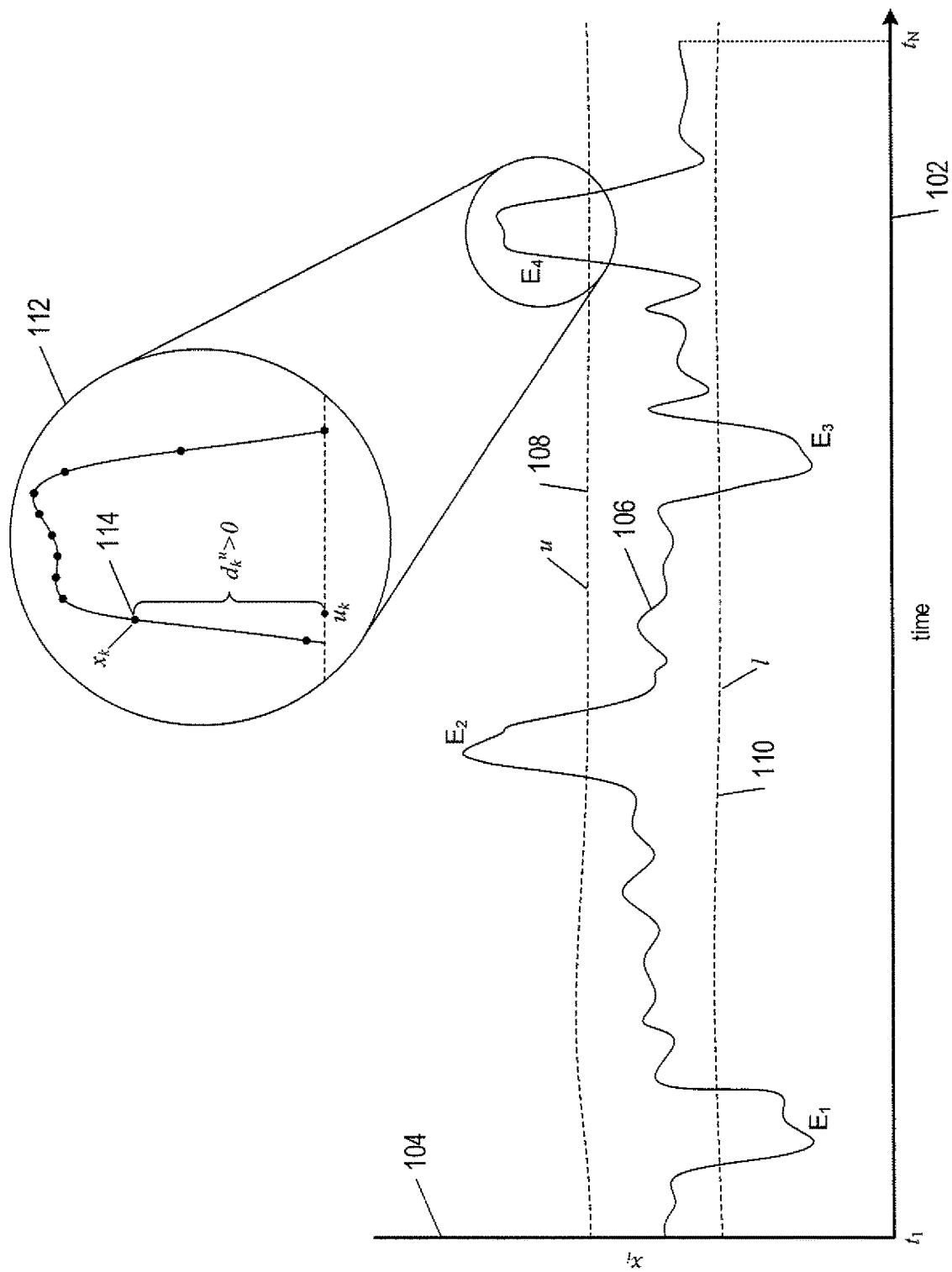
FIG. 1 shows a plot of example historical time-series data and upper and lower dynamic thresholds.

Methods and systems for estimating a degree of abnormality of a complex system via analysis of historical violations of thresholds are described. The methods and systems are based on the assumption that the behavior, performance, or usage of a complex system may be characterized by the distance and duration of a threshold violation of current time-series data that represents the behavior, performance, or usage of the complex system. In a first approach, each degree of abnormality is based separately on the distance and duration of threshold violations. In a second approach, each degree of abnormality is based on a combination of the distance and duration of the threshold violations. Both approaches follow the same procedure. First, historical time-series data that is representative of the past behavior, performance, or usage of the complex system are collected. Historical analysis of threshold violations of the historical time-series data is performed to generate an estimated historical degree of abnormality. Second, current time-series data that is representative of the current behavior, performance, or usage of the complex system is also analyzed for threshold violations to generate an estimated current degree of abnormality. Third, the estimated current degree of abnormality is compared with the estimated historical degree of abnormality in order to determine whether or not the current violations are worthy of attention.

Begin by considering a set of historical time-series data represented by:

$$X=\{x_k\}_{k=1}^{N} \qquad (1)$$

where $x_k=x(t_k)$ is a data value generated with a time stamp $t_k$; and
N is the number of historical data values.

Each data value may be a metric value that represents the result of a measurement performed on complex systems at a time stamp by, for example, a sensor or each data value may be a metric value generated by the complex system itself that represents behavior, performance, or usage of the complex system at a time stamp.

Abnormalities in the time-series data may be assessed with respect to an upper threshold denoted by u and/or a lower threshold denoted by l. The upper and lower threshold may both be dynamic thresholds that vary with time, the upper and lower thresholds may both be constant thresholds, or the upper and lower thresholds may be a combination of dynamic and constant thresholds. An abnormality occurs when one or more data values in the time series are greater than the upper threshold or less than the lower threshold. For example, when a data value satisfies the condition $l \leq x_k \leq u$, the data value is considered normal. By contrast, when a data value is $x_k < l$ or $u < x_k$, the data value is considered abnormal and a series of one or more consecutive abnormal data values is called an "event." In other words, the term "event" refers to a sub-series of consecutive time-series data values that do not satisfy (i.e., violates) the condition $l \leq x_k \leq u$. An event composed of consecutive data values that are greater than the upper threshold is called an "upper-threshold event," and an event composed of data values that are less than the lower threshold is called a "lower-threshold event."

FIG. 1 shows a plot of example historical time-series data and upper and lower dynamic thresholds. Horizontal axis 102 represents time and vertical axis 104 represents a range of data values. Curve 106 represents historical time-series data X. Dashed curve 108 represents an upper dynamic threshold and dashed curve 110 represents a lower dynamic threshold. A constant upper or lower threshold would be represented by a straight line that runs parallel to the time axis 102. The example historical time-series data shown in FIG. 1 includes four events denoted by $E_1$, $E_2$, $E_3$, and $E_4$. The events $E_1$ and $E_3$ are each composed of a sub-series of consecutive time-series data of the set X that are less the lower threshold 110 and are called lower-threshold events. The events $E_2$ and $E_4$ are composed of a sub-series of consecutive time-series data of the set X that are greater than the upper threshold 108 and are called upper-threshold events. For example, FIG. 1 includes a magnified view 112 of the sub-series of consecutive time-series data that makes up upper-threshold event $E_4$. In magnified view 112, the time-series data are represented by dots. For example, dot 114 represents the kth time series datum $x_k$.

A first approach for determining historical and current degrees of abnormality based separately on the distance and duration of threshold violations are now described. Events are determined by computing a distance of each data value from the upper and lower thresholds. Let $u_k$ denote the value of the upper threshold at time stamp $t_k$. The distance of a data value $x_k$ from the upper threshold $u_k$ at time stamp $t_k$ is given by:

$$d_k^u = x_k - u_k \qquad (2)$$

Likewise, let $l_k$ denote the value of the lower threshold at time stamp $t_k$. The distance of a data value $x_k$ from the lower threshold $l_k$ at the time stamp $t_k$ is given by:

$$d_k^l = l_k - x_k \qquad (3)$$

When the distance $d_k^u \leq 0$ and the distance $d_k^l \leq 0$, the data value $x_k$ is considered normal and an event has not occurred. On the other hand, when either $d_k^u > 0$ or $d_k^l > 0$ occurs, the data value $x_k$ is considered abnormal and an event has occurred. Returning to FIG. 1, each of the upper-threshold events $E_2$ and $E_4$ correspond to a sub-series of consecutive time-series data values where $d_k^u > 0$ and each of the lower-threshold events $E_1$ and $E_3$ correspond to a sub-series of time-series data values where $d_k^l > 0$.

The distances $d_k^u > 0$ for the full set of time-series data may be collected to form a set of historical upper-threshold event distances given by $$D^u = \{d_k^u\}_{k=1}^{M} \qquad (4)$$

where $d_k^u > 0$; and
M is the number of historical upper threshold violations.

Likewise, the distances $d_k^l > 0$ for the full set of time-series data may also be collected to form a set of historical lower-threshold event distances given by $$D^l = \{d_k^l\}_{k=1}^{R} \qquad (4)$$

where $d_k^l > 0$; and
R is the number of historical lower threshold violations.

Alternatively, a single distance metric may be calculated for each upper-threshold event, and the distance metrics may be collected to form a set of historical upper-threshold distance metrics. Consider an upper-threshold event $E_j$ composed of a set of in distances greater than zero:

$$d_1^{u(j)}, d_2^{u(j)}, \ldots, d_m^{u(j)} \qquad (6)$$

where $d_i^{u(j)} > 0$, for $1 \leq i \leq m$.

A distance metric for the upper-threshold event $E_j$ may calculated as follows:

$$\overline{d}_j^u = \varphi(d_1^{u(j)}, d_2^{u(j)}, \ldots, d_m^{u(j)}) \qquad (7)$$

where $\varphi$ represents one of the mean, median, and maximum of the distances.

Figure 2:
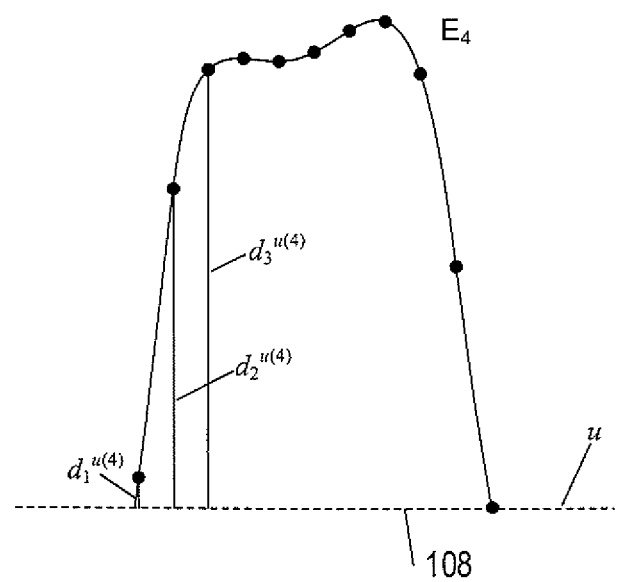
FIG. 2 shows an example of distances of an upper-threshold event, shown in FIG. 1.

FIG. 2 shows an example of distances associated with the upper-threshold event $E_4$ shown in FIG. 1. The upper-threshold event $E_4$ is composed of eleven (i.e., m=11) data values that are greater than of the upper threshold 108. The set of distances associated with these data values may be represented by $d_1^{u(4)}, d_2^{u(4)}, \ldots, d_{11}^{u(4)}$ and a distance metric $\overline{d}_4^u$ associated with the upper-threshold event $E_4$ may be the mean, median, or maximum of the set of distances.

This procedure may be repeated for each upper-threshold event and the distance metrics associated with the upper-threshold events may be collected to form a set of historical upper-threshold distance metrics represented by:

$$\overline{D}^u = \{\overline{d}_j^u\}_{j=1}^J \tag{8}$$

where J represents the number of upper-threshold events.

Likewise, consider a lower-threshold event $E_q$ composed of r lower-threshold distances greater than zero:

$$d_1^{l(q)}, d_2^{l(q)}, \ldots, d_r^{l(q)} \tag{9}$$

where $d_i^{l(q)} > 0$, for $1 \le i \le r$.

A distance metric may be calculated as follows:

$$\overline{d}_q^u = \varphi(d_1^{u(q)}, d_2^{u(q)}, \ldots, d_r^{u(q)}) \tag{10}$$

where $\varphi$ represents one of the mean, median, and maximum of the distances.

The distance metrics of the lower-threshold events may be collected to form a set of historical lower-threshold distance metrics represented by:

$$\overline{D}^l = \{\overline{d}_q^l\}_{q=1}^Q \tag{11}$$

where Q represents the number of lower-threshold events.

The duration of each event may be determined. Let $\tau_j$ be the duration of the j-th event. The duration may be calculated as $\tau_j = \tau_{j,end} - \tau_{j,start}$, where $\tau_{j,start}$ represents the time stamp of the first data value in the upper-threshold event $E_j$ to violate the upper threshold and $\tau_{j,end}$ represent the time stamp of the last data value in the upper-threshold event $E_j$ to violate the upper threshold.

Figure 3:
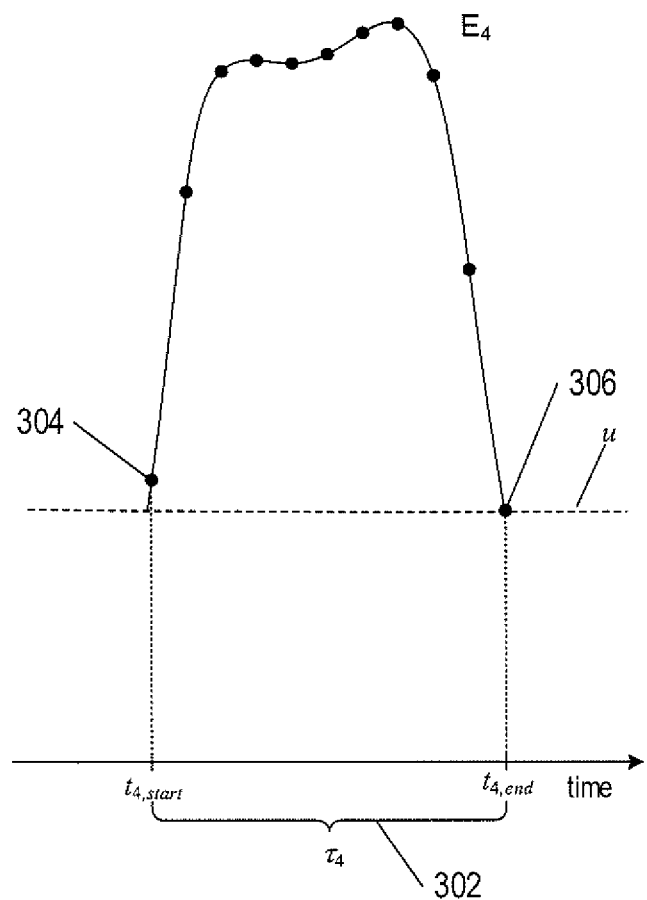
FIG. 3 shows an example of a duration of an upper-threshold event, shown in FIG. 1.

FIG. 3 shows an example of a duration for the upper-threshold event $E_4$ shown in FIG. 1. The duration 302 may be calculated as $\tau_4 = \tau_{4,end} - \tau_{4,start}$, where $\tau_{4,start}$ represents the time stamp of the first data value 304 to violate the upper threshold 108 and $\tau_{4,end}$ represent the time stamp of the last data value 306 to violate the upper threshold.

The durations of the upper-threshold events may be collected to form a set of historical upper-threshold event durations given by $$T^u = \{\tau_j\}_{j=1}^J \tag{12}$$

Analogously, the durations of the lower-threshold events may also be collected to form a set of historical lower-threshold event durations given by $$T^l = \{\tau_q\}_{q=1}^Q \tag{13}$$

The sets $D^u$, $D^l$, $\overline{D}^u$, and $\overline{D}^l$ are distance sets of abnormalities and the sets $T^u$ and $T^l$ are duration sets of abnormalities that may combined as follows to provide a two-component representation of historical threshold violations. Upper-threshold combined set of abnormalities may be formed from the set of historical upper-threshold event distances and the set of historical upper-threshold event durations as follows:

$$G^u = (D^u, T^u) \tag{14}$$

Alternatively, an upper-threshold combined set of abnormalities may be formed from the set of historical upper-threshold distance metrics and the set of historical upper-threshold event durations as follows:

$$G^u = (\overline{D}^u, T^u) \tag{15}$$

Likewise, a lower-threshold combined set of abnormalities may be formed from the set of historical lower-threshold event distances and the set of historical lower-threshold event durations as follows:

$$G^l = (D^l, T^l) \tag{16}$$

Alternatively, a lower-threshold combined set of abnormalities may be formed from the set of historical lower-threshold duration metrics and the set of historical lower-threshold event durations as follows:

$$G^l = (\overline{D}^l, T^l) \tag{17}$$

When the duration between time stamps is substantially constant, the set of historical upper-threshold durations may be replaced by a set of historical upper-threshold counts. Let $c_j$ be the number of time stamps (i.e., event counts) associated with data values of the jth upper-threshold event $E_j$.

Figure 4:
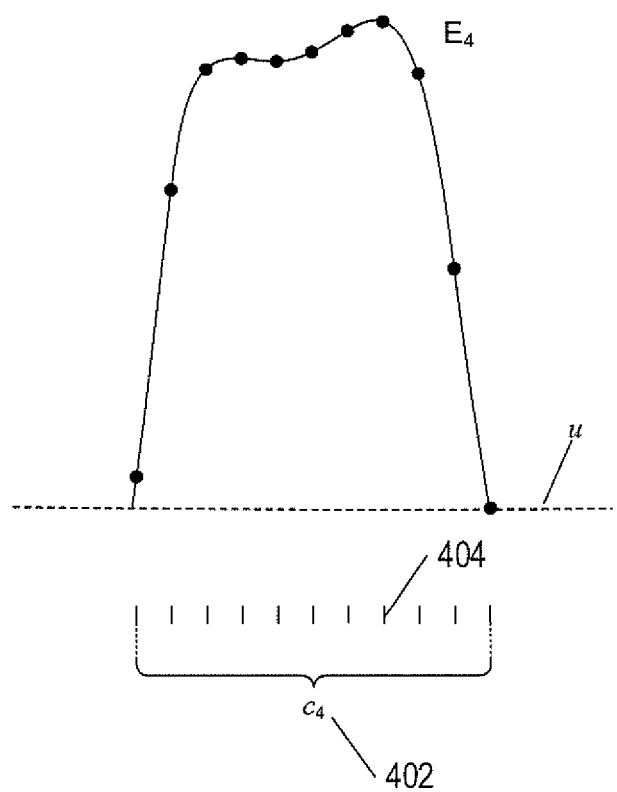
FIG. 4 shows an example of a count of an upper-threshold event, shown in FIG. 1.

FIG. 4 shows an example of an event count for the upper-threshold event $E_4$ shown in FIG. 1. The event count 402 is the number of time stamps represented by line segments, such as line segment 404, that correspond to the data values that form the upper-threshold event $E_4$.

The event counts of the upper-threshold events may be collected to form a set of historical upper-threshold event counts given by $$C^u = \{c_j\}_{j=1}^J \tag{18}$$

Analogously, the event counts of the lower-threshold events may also be collected to form a set of historical lower-threshold event counts given by $$C^l = \{c_q\}_{q=1}^Q \tag{19}$$

The sets $C^u$ and $C^l$ are count sets of abnormalities that may be combined with distance sets of abnormalities $D^u$, $D^l$, $\overline{D}^u$, and $\overline{D}^l$ as follows to provide additional two-component representations of historical threshold violations. An upper-threshold combined set of abnormalities may be formed from the set of historical upper-threshold event distances and the set of historical upper-threshold event counts as follows:

$$G^u = (D^u, C^u) \tag{20}$$

Alternatively, an upper-threshold combined set of abnormalities may be formed from the set of historical upper-threshold distance metrics and the set of historical upper-threshold event counts as follows:

$$G^u = (\overline{D}^u, C^u) \tag{21}$$

Likewise, a lower-threshold combined set of abnormalities may be formed from the set of historical lower threshold distances and the set of historical lower-threshold counts as follows:

$$G^l = (D^l, C^l) \tag{22}$$

Alternatively, a lower-threshold combined set of abnormalities may be formed from the set of historical lower-threshold distance metrics and the set of historical lower-threshold event counts as follows:

$$G^l = (\overline{D}^l, C^l) \tag{23}$$

Equations (14)-(17) and (20)-(23) represent the various types of combined sets of abnormalities that may be formed from historical time-series data. In practice, only one upper-threshold combined set of abnormalities and only one lower-threshold combined set of abnormalities are formed from historical time-series data. After an upper-threshold combined set of abnormalities and a lower-threshold combined set of abnormalities are formed from the historical time-series data, a corresponding pair of upper and lower estimated historical degrees of abnormality are determined.

Upper and lower threshold estimated historical degrees of abnormality that correspond to the upper and lower combined sets of abnormalities given by Equations (15)-(17) are denoted by $$G_0^u = (D_0^u, T_0^u) \qquad (24a)$$

$$G_0^u = (\overline{D}_0^u, T_0^u) \qquad (24b)$$

$$G_0^l = (D_0^l, T_0^l) \qquad (24c)$$

$$G_0^l = (\overline{D}_0^l, T_0^l) \qquad (24d)$$

Upper and lower threshold estimated historical degrees of abnormality that correspond to the upper and lower combined sets of abnormalities given by Equations (20)-(23) are denoted by $$G_0^u = (D_0^u, C_0^u) \qquad (25a)$$

$$G_0^u = (\overline{D}_0^u, C_0^u) \qquad (25b)$$

$$G_0^l = (D_0^l, C_0^l) \qquad (25c)$$

$$G_0^l = (\overline{D}_0^l, C_0^l) \qquad (25d)$$

In Equations (24)-(25), the two quantities within the brackets are called "abnormality degree components." For example, the quantities $D_0^u$ and $T_0^u$ in Equation (24a) are the abnormality degree components of the upper historical degree of abnormality $G_0^u$. Each abnormality degree component of an upper or a lower historical degree of abnormality is a numerical value. For example, the quantities $D_0^u$ and $T_0^u$ in Equation (24a) are numerical values.

The follow description presents a method for determining an abnormality degree component $S_0$ based on a corresponding set of abnormalities S. In the following description, the set of abnormalities S represents any one or the sets of abnormalities described above with reference to Equations (14)-(17) and (20)-(23) and the abnormality degree component $S_0$ represents any one of the corresponding abnormality degree components introduced in Equations (24)-(25). For example, the set S may represents the set of historical upper-threshold event distances $D^u$ represented by Equation (4) and $S_0$ may represent the corresponding abnormality degree component $D_0^u$. The abnormality degree component $S_0$ may be computed as the inverse of an empirical cumulative distribution of the set S denoted by $F_{S,emp}^{-1}(s)$. Methods for computing the inverse of the empirical cumulative distribution for the set S are now described. It should be noted that although in the following description only one method is described for determining abnormality degree component $S_0$, other methods may be used to determine an abnormality degree component $S_0$ based on a corresponding set of abnormalities S. For example, an abnormality degree component $S_0$ of the set S may be determined based on hard or dynamic thresholds for S. In the case of dynamic thresholds, the abnormality degree component $S_0$ may include cyclical behavior of the set S. In other words, different time segments may have different degrees of abnormalities.

First, a histogram of the values s comprising the set S is computed. The histogram is formed by dividing the range of value s in the set S into L subintervals (i.e., bins). Each subinterval covers a range of values associated with the value s. The fraction of values in each subinterval may be calculated by counting the number of values s in the set S that lie within each subinterval and dividing by the total number of values s in the set S. The fraction of values s calculated for each subinterval is a probability denoted by $v_l$, where $0 \leq v_l \leq 1$ for a subinterval index $l=1, \ldots, L$. The probability $v_l$ associated with the l-th subinterval represents the probability that a randomly selected value s from in the set S lies within the l-th subinterval.

Figure 5:
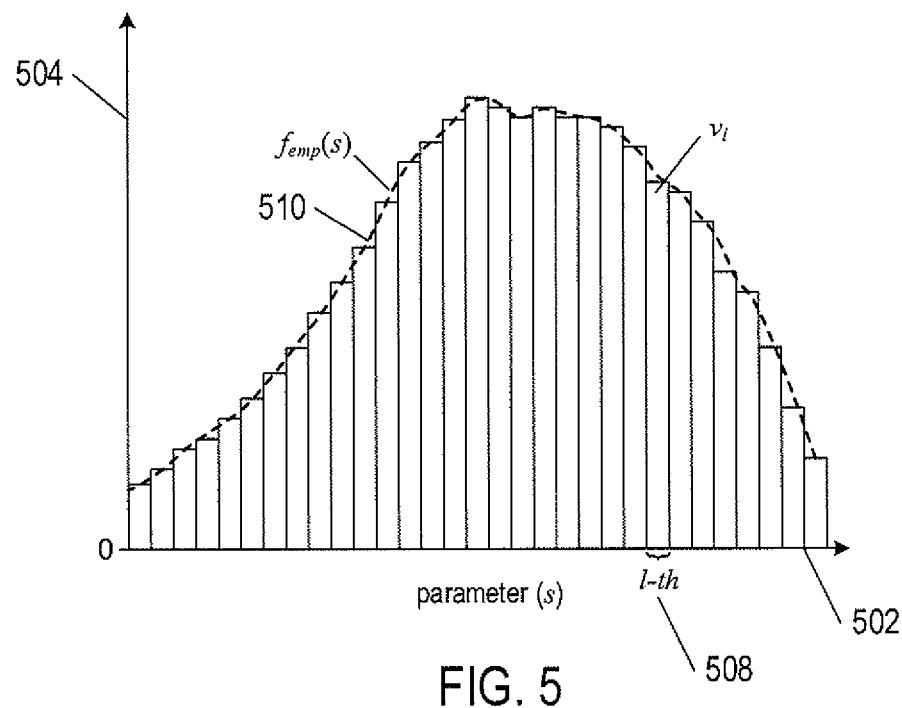
FIG. 5 shows a plot of an example histogram.

FIG. 5 shows a plot of an example histogram of values s in the set S. Horizontal axis 502 represents a range of values, and vertical axis 504 represents a range of real numbers greater than 0. Bars represent the probability of values in S lies within subintervals. For example, bar 506 represent the probability $v_l$ that a value s selected from the set S lies in the lth subinterval 508.

An empirical probability density function is then calculated for the set S based on the histogram. An empirical probability density function denoted by $f_{emp}$ may be interpolated or estimated from the histogram of the set S. The empirical probability density function may be obtained using density estimation of the histogram corresponding to the set S or by fitting a polynomial to the probabilities (i.e., fractions) of the histogram for the set S.

Returning to FIG. 5, a dashed curve 510 that passes through the probabilities $v_l$ represented by the bars represents an interpolated empirical probability density function $f_{emp}$ that characterizes the probability of the random distribution of values in the set S.

An empirical cumulative distribution $F_{S,emp}$ associated with the set S is calculated from the corresponding empirical probability density function $f_{emp}$. The empirical cumulative distribution $F_{S,emp}$ represents the probability that a randomly selected value in the set S will have a value less than or equal to a particular value s. An empirical cumulative distribution $F_{S,emp}$ may be represented mathematically as the integral of an empirical probability density function $f_{emp}$ as follows:

$$F_{S,emp}(s) = \int_0^s du f_{emp}(u) \qquad (26)$$

where s represents a value along the axis 502 in FIG. 5. An empirical cumulative distribution $F_{S,emp}$ may be calculated from a probability density function $f_{emp}$ using any one of many different numerical integration techniques. Alternatively, an empirical cumulative distribution $F_{S,emp}$ may be calculated as a sum of the probabilities $v_l$ up to and including the lth interval that contains the value s as follows:

$$F_{S,emp}(s) \approx \sum_{l=1}^{l_s} v_l \qquad (27)$$

where $l_s$ is the subinterval that contains the value s.

The abnormality degree component $S_0$ may be determined by computing the inverse of an empirical cumulative distribution as follows:

$$S_0 = F_{S,emp}^{-1}(s_0) \qquad (28)$$

where $0 \leq s_0 \leq 1$ (e.g., $s_0 = 0.7$).

For example, the lower-threshold estimated historical degree of abnormality of Equation (25c) is given by $$G_0^l = (D_0^l, C_0^l) = (F_{D^i,emp}^{-1}(s_D) F_{C^i,emp}^{-1}(s_C)) \qquad (29)$$

where $0 \leq s_D, s_C \leq 1$ (e.g., $s_D = s_C = 0.7$); and $F_{D^i,emp}^{-1}(s_D)$ is the inverse of the empirical cumulative distribution for the set $D^i$; and $F_{C^i,emp}^{-1}(s_C)$ is the inverse of the empirical cumulative distribution for the set $C^i$.

In an alternative implementation, a parametric cumulative distribution $F_S$ may be calculated based on the empirical cumulative distribution $F_{S,emp}$ by making an appropriate selection of the parameters of the parametric cumulative distribution $F_S$. For example, the parameters associated with a parametric cumulative distribution $F_S$ may be calculated so that the parametric cumulative distribution $F_S$ approximates the empirical cumulative distribution $F_{S,emp}$.

Figure 6:
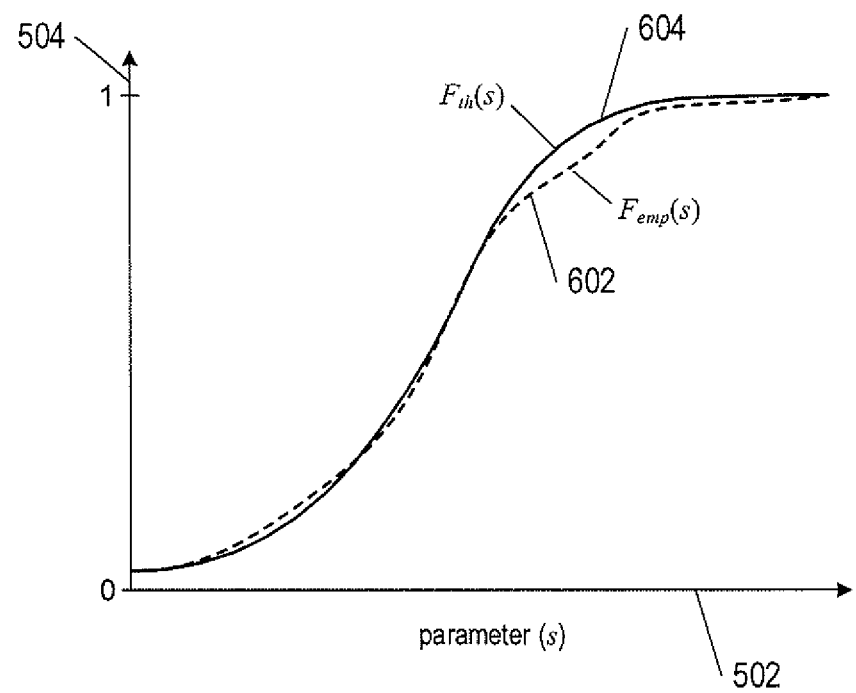
FIG. 6 shows a plot of an empirical cumulative distribution and a corresponding parametric cumulative distribution.

FIG. 6 shows a plot of an empirical cumulative distribution $F_{S,emp}$ represented by dashed curve 602 and a corresponding parametric cumulative distribution $F_S$ represented by solid curve 604. The parametric cumulative distribution $F_S$ 604 may be obtained by calculating the parametric cumulative distribution parameters as a best fit to the empirical cumulative distribution $F_{S,emp}$.

One type of parametric cumulative distribution selected for the set S is based primarily on the shape of the histogram of the set S. For example, a Cauchy distribution may be used as a parametric cumulative distribution $F_S$ that characterizes the distribution of value s of the set S as follows:

$$F_S(s) = \frac{1}{\pi}\arctan\left(\frac{s-\mu}{\gamma}\right) + \frac{1}{2} \tag{30}$$

where
$\mu$ is a location parameter; and
$\gamma$ is a scale parameter.
The parameters $\mu$ and $\gamma$ are determined as a best fit to an empirical cumulative distribution $F_{S,emp}$.

Examples of other parametric cumulative distributions that may to be used includes a generalized Pareto ("GP") distribution and a generalized extreme value ("GEV") distribution. The GP distribution is given by:

$$F_S(s) = 1 - \left(1 - \frac{\gamma s}{\sigma}\right)^{\frac{1}{\gamma}} \tag{31}$$

for $\lambda \neq 0$ and $\sigma > 0$; and $$F_S(s) = 1 - e^{-\frac{s}{\sigma}} \tag{32}$$

for $\lambda = 0$ and $\sigma > 0$,
where $s \geq 0$ if $\gamma \leq 0$; and
$0 \leq s \leq \sigma/\gamma$ if $\gamma > 0$.
The parameters $\gamma$ and $\sigma$ of the GP distribution are determined as a best fit to an empirical cumulative distribution $F_{S,emp}$. The GEV distribution is given by:

$$F_S(s) = \exp\left\{-\left[1 + \xi\left(\frac{s-\mu}{\sigma}\right)\right]^{-\frac{1}{\xi}}\right\} \tag{33}$$

for $$1 + \xi\left(\frac{s-\mu}{\sigma}\right) > 0,$$

where $\xi \neq 0$ is the shape parameter, $\mu$ is a location parameter, and $\sigma > 0$; and $$F_S(s) = \exp\left\{-\exp\left(-\frac{s-\mu}{\sigma}\right)\right\} \tag{34}$$

for $\xi = 0$.
The parameters $\mu$, $\sigma$, $\xi$ of the GEV distribution are determined as a best fit to the empirical cumulative distribution $F_{S,emp}$.

The abnormality level component $S_0$ may be given by the inverse of a parameter cumulative distribution as follows:

$$S_0 = F_S^{-1}(s_0) \tag{35}$$

where $0 \leq s_0 \leq 1$ (e.g., $s_0 = 0.7$).
For example, the upper-threshold estimated historical degree of abnormality of Equation (24a) is given by $$G_0^u = (D_0^u, T_0^u) = (F_{D^u}^{-1}(s_D), F_{T^u}^{-1}(s_T)) \tag{36}$$

where
where $0 \leq s_D, s_T \leq 1$ (e.g., $s_D = s_C = 0.7$).
$F_{T^u}^{-1}(s_D)$ is the inverse of a parametric cumulative distributions for the set $D^u$; and
$F_{T^u}^{-1}(s_T)$ is the inverse of a parametric cumulative distributions for the set $T^u$.

Any one of the upper historical abnormality levels given by Equations (24a)-(24b) and Equations (25a)-(25b) may be used to determine whether or not a current upper-threshold violation is worthy of attention, and any one of the lower historical abnormality levels given by Equations (24c)-(24d) and Equations (25c)-(25d) may be used to determine whether or not a current lower-threshold violation is worthy of attention. When a threshold violation occurs, a number of additional current violations may be allowed to accumulate. Consider a sequence of n current threshold violations represented by $$d_{M+1}, d_{M+2}, \ldots, d_{M+n} \tag{37}$$

where the distance $d_{M+n}$ corresponds to the most recent current violation of a threshold.
A current distance metric is computed for the current event as follows:

$$d^{run\text{-}time} = \varphi(d_{M+1}, d_{M+2}, \ldots d_{M+n}) \tag{38}$$

where $\varphi$ is the mean, median, or maximum of the distances given by Equation (37).
An estimated current degree of abnormality may be given by $$G^{run\text{-}time} = (d^{run\text{-}time}, n) \tag{39}$$

where n is the time stamp count of the current event.
Alternatively, the estimated current degree of abnormality may be given by $$G^{run\text{-}time} = (d^{run\text{-}time}, T^{run\text{-}time}) \tag{40}$$

where $T^{run\text{-}time}$ is the current duration of the current event.

Figure 7:
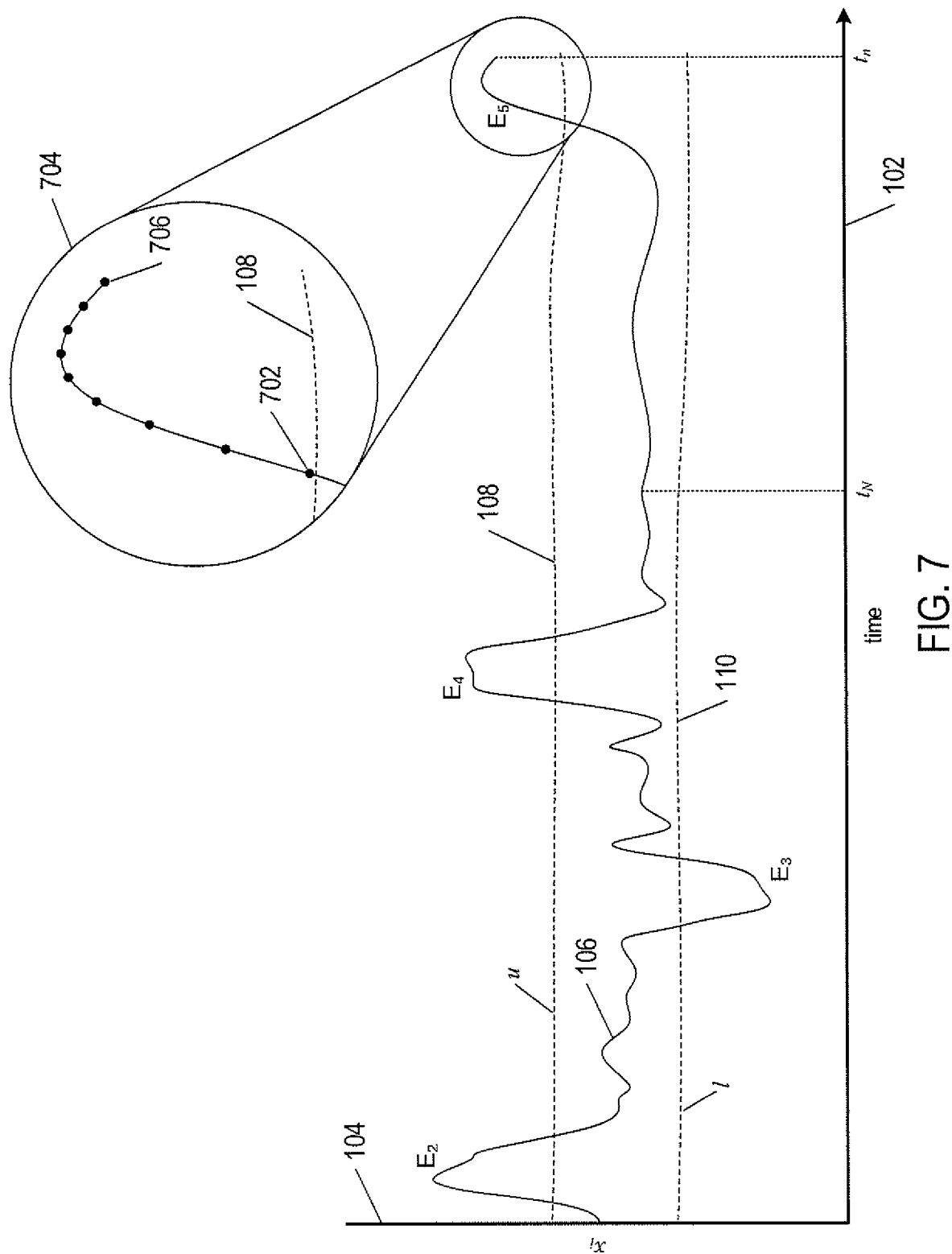
FIG. 7 shows a plot of current data generated for a complex system after the historical time-series data shown in FIG. 1.

FIG. 7 shows a plot of current data generated for the complex system after the historical time-series data shown in FIG. 1. Time stamp $t_N$ identifies the final time stamp of the historical time-series data. As shown FIG. 7, current data collected after the time stamp $t_N$ includes an upper-threshold event $E_5$. When a threshold violation occurs at data value 702 in magnified view 704 of upper-threshold event $E_5$, eight additional data values are allowed to accumulate, where data value 706 represents the most recent data value generated by the complex system.

Figure 8:
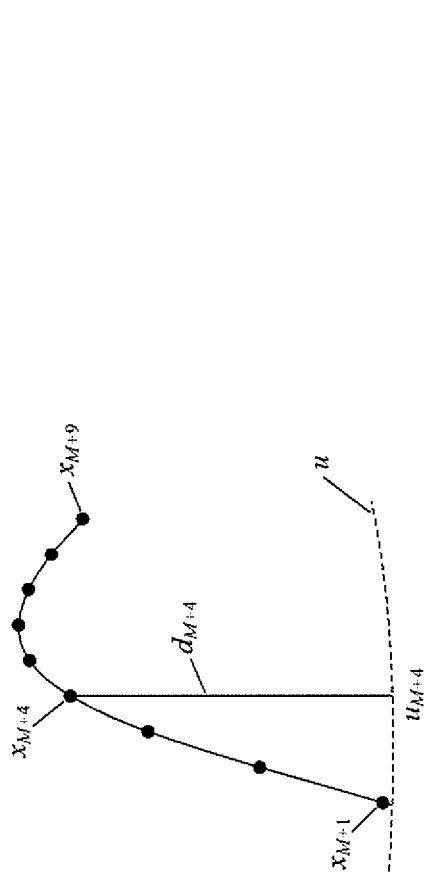
FIG. 8 shows an example of distances of a current event.

FIG. 8 shows an example distance $d_{M+4}$ calculated for the data value $x_{M+4}$ from the upper threshold. Distances are likewise computed for each of data values comprising the event $E_5$.

Figure 9:
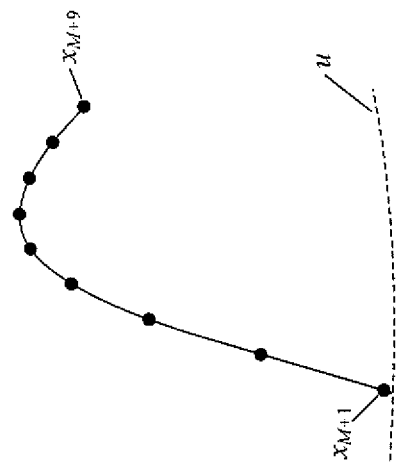
FIG. 9 shows an example of a duration of a current event.

FIG. 9 shows the count of the upper-threshold event $E_5$. The count 902 is the number of time stamps represented by line segments that correspond to the data values that form the upper-threshold event $E_5$.

Figure 10:
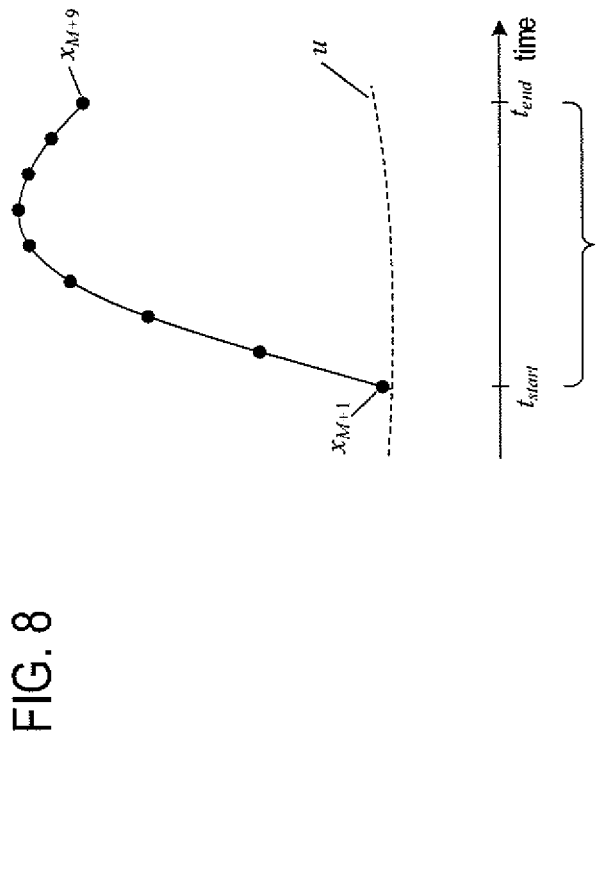
FIG. 10 shows an example of a count of a current event.

FIG. 10 shows the duration of the upper-threshold event $E_5$. The duration 1002 may be calculated as $T^{run-time} = t_{end} - t_{start}$, where $t_{start}$ represents the time stamp of the data value $x_{M+1}$ and $t_{end}$ represent the time stamp of the data value $x_{M+9}$.

When the current degree of abnormality $G^{run-time}$ is produced for an event, the components of the current degree of abnormality $G^{run-time}$ are compared with the components of the estimated historical degree of abnormality computed for the historical time-series data. If one or both components of the current degrees of abnormality are greater than one or more both of the corresponding components of the estimated historical degree of abnormality, the event may be considered worthy of attention and an alert may be generated.

Consider, for example, the following pseudo-code representation of determining whether the current degree of abnormality $G^{run-time}$ associated with an event triggers an alert:

```
1   Compute G_0^u = (D_0^u,T_0^u) for historical time-series data;
2   Compute G_0^l = (D_0^l,T_0^l) for historical time-series data;
3   Compute G^run-time for a current current time-series data;
4   if (G^run-time corresponds to an upper-threshold event) {
5       if (d^run-time > D_0^u and T^run-time > T_0^u) {   // event is worthy of
              attention
6           generate alert;
7           return;
8       }
9   }
10  if (G^run-time corresponds to a lower-threshold event) {
11      if (d^run-time > D_0^l and T^run-time > T_0^l) {   // event is worthy of
              attention
12          generate alert;
13          return;
14      }
15  }
```

In an alternative implementation, rather than comparing both current abnormality degree components with historical abnormality degree components, a single metric based on the abnormality degree components may be used. Consider a metric of the form $f(x,y)$, where x and y are abnormality degree components of an estimated historical degree of abnormality. For example, the metric may be product to the abnormality degree components $f(x,y)=xy$ or a linear combination of the abnormality degree components $f(x,y)=ax+by$, where a and b are weights assigned to the components. An abnormality threshold may also be defined by $f(x_0,y_0)$ and compared with a current metric $f(x^{run-time},y^{run-time})$. When $f(x^{run-time},y^{run-time}) > f(x_0,y_0)$, an alert is generated.

Consider, for example, the following pseudo-code representation of determining whether the current degree of abnormality $G^{run-time}$ associated with an event triggers an alert:

```
1   Compute G_0^u = (D_0^u,T_0^u) for historical time-series data;
2   Compute G_0^l = (D_0^l,T_0^l) for historical time-series data;
3   Compute G^run-time (d^run-time,T^run-time) for a current current time-
        series data;
4   if (G^run-time corresponds to an upper-threshold event) {
5       f (d^run-time,T^run-time);
6       f (D_0^u,T_0^u);
7       if (f (d^run-time,T^run-time) > f (D_0^u,T_0^u)) {   // event is worthy of
              attention
8           generate alert;
9           return;
10      }
11  }
12  if (G^run-time corresponds to a lower-threshold event) {
13      f (d^run-time,T^run-time);
14      f (D_0^l,T_0^l);
15      if (f (d^run-time,T^run-time) > f (D_0^l,T_0^l)) {   // event is worthy of
              attention
16          generate alert;
17          return;
18      }
19  }
```

A second approach to determining historical and current degrees of abnormality is now described. Methods begin by computing by computing relative distances as follows. For each data value $x_i$ greater than a corresponding upper threshold $u_i$ at time stamp $t_i$, a relative distance may be calculated according to $$r_{i,j} \equiv \frac{x_i - u_i}{u_i - l_i} \tag{41}$$

where
subscript "i" is a time stamp index; and
subscript "j" is an event index.

For each data value $x_i$ less than a corresponding lower threshold $l_i$ at time stamp $t_i$, a relative distance may be calculated according to $$r_{i,j} \equiv \frac{l_i - x_i}{u_i - l_i} \tag{42}$$

Figure 11A:
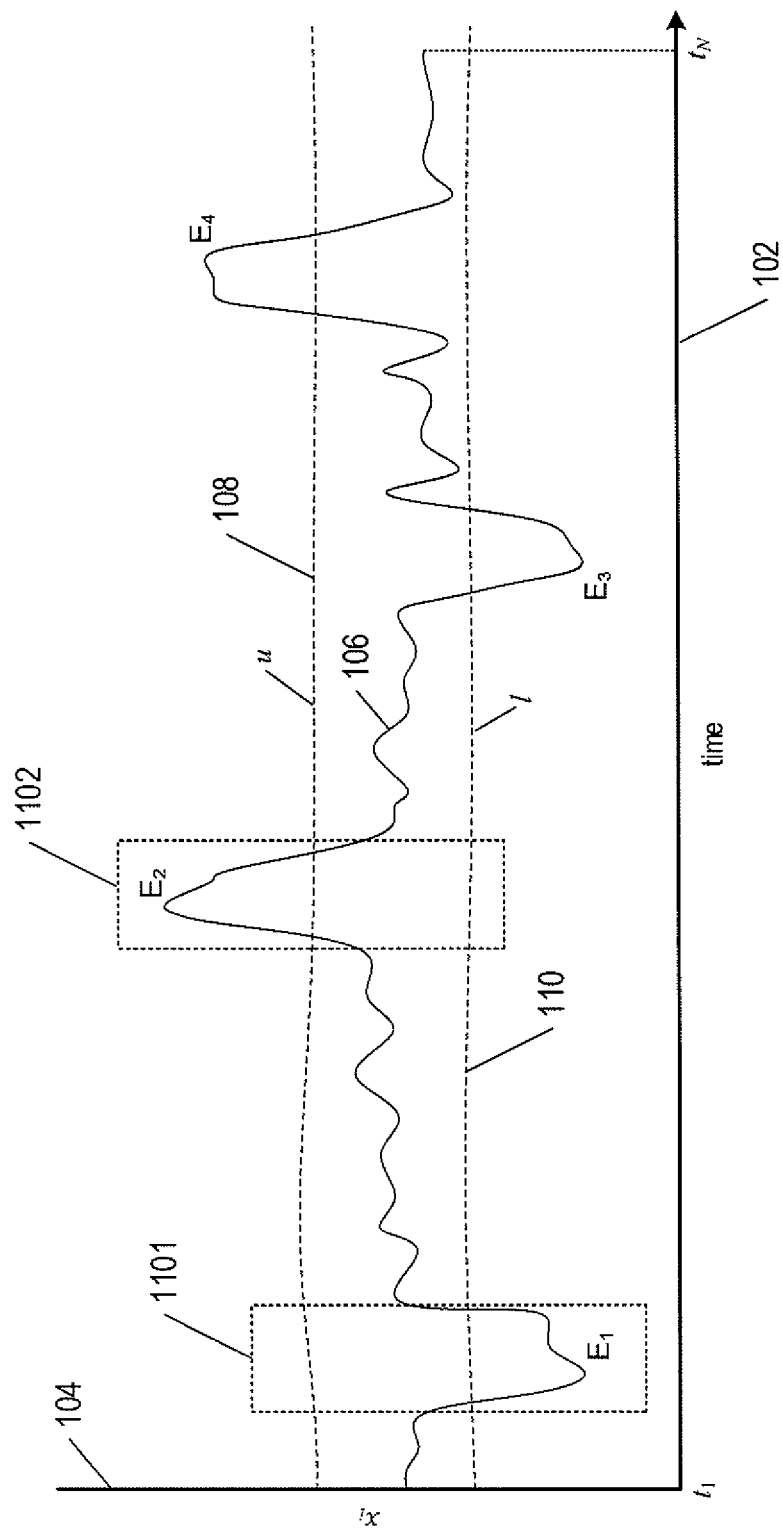
FIGS. 11A-11C show plots of example relative distances of the historical time-series data shown in FIG. 1.
Figure 11B:
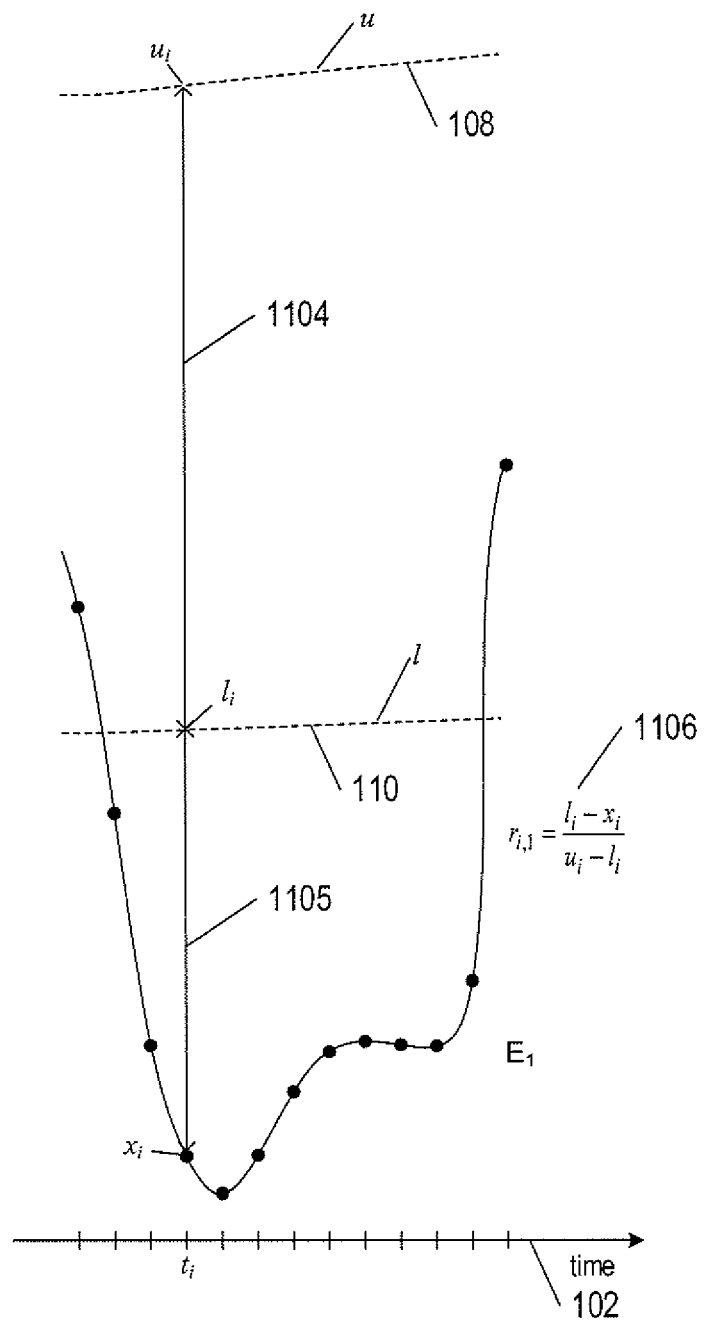
Figure 11C:
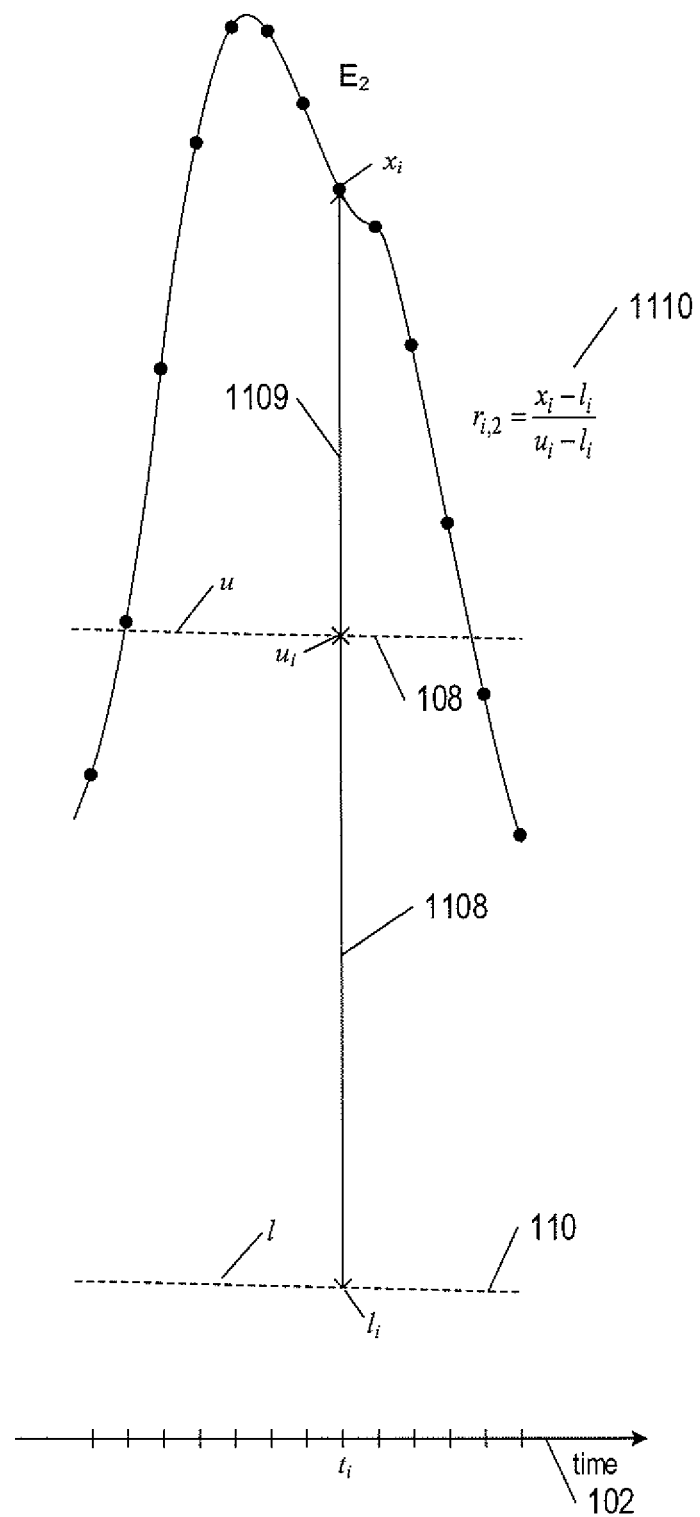

FIGS. 11A-11C show an example calculation of the relative distances for two data values of the historical time-series data shown in FIG. 1. FIG. 11A shows the historical time-series data shown in FIG. 1 with a first dashed-line box 1101 enclosing the lower-threshold event $E_1$ and a second dashed-line box 1102 enclosing the upper-threshold event $E_2$. FIG. 11B shows a magnified view of the lower-threshold event $E_1$ and portions the upper threshold 108 and lower threshold 110 contained within the first box 1101. Line segment 1104 represents the distance between the upper threshold $u_i$ and the lower threshold $l_i$ at time stamp $t_i$. Line segment 1105 represents the distance between the lower threshold $l_i$ and the data value $x_i$ at the same time stamp $t_i$. Relative distance $r_{i,1}$ 1106 is the distance of the data value $x_i$ from the lower threshold $l_i$ divided by the distance of the upper threshold $u_i$ from the lower threshold $l_i$ at the time stamp $t_i$. FIG. 11C shows a magnified view of the upper-threshold event $E_2$ and portions the upper threshold 108 and lower threshold 110 contained within the second box 1102. Line segment 1108 represents the distance between the upper threshold $u_i$ and the lower threshold $l_i$ at time stamp $t_i$. Line segment 1109 represents the distance from the data value $x_i$ to the lower threshold $l_i$ at the same time stamp $t_i$. Relative distance $r_{i,2}$ 1110 is the distance of the data value $x_i$ from the upper threshold $u_i$ divided by the distance from the upper threshold $u_i$ to the lower threshold $l_i$ at the time stamp $t_i$.

After the relative distances have been computed for each event, the relative distances associated with each event are integrated over the duration of the event. Consider a set of relative distances associated with an event $E_j$:

$$\{r_{1,j}, r_{2,j}, \ldots, r_{n_j,j}\} \quad (43)$$

where $n_j$ represents the number of time stamps (i.e., counts) associated with the event $E_j$.

The event $E_j$ may be an upper-threshold event or a lower-threshold event.

Figure 12:
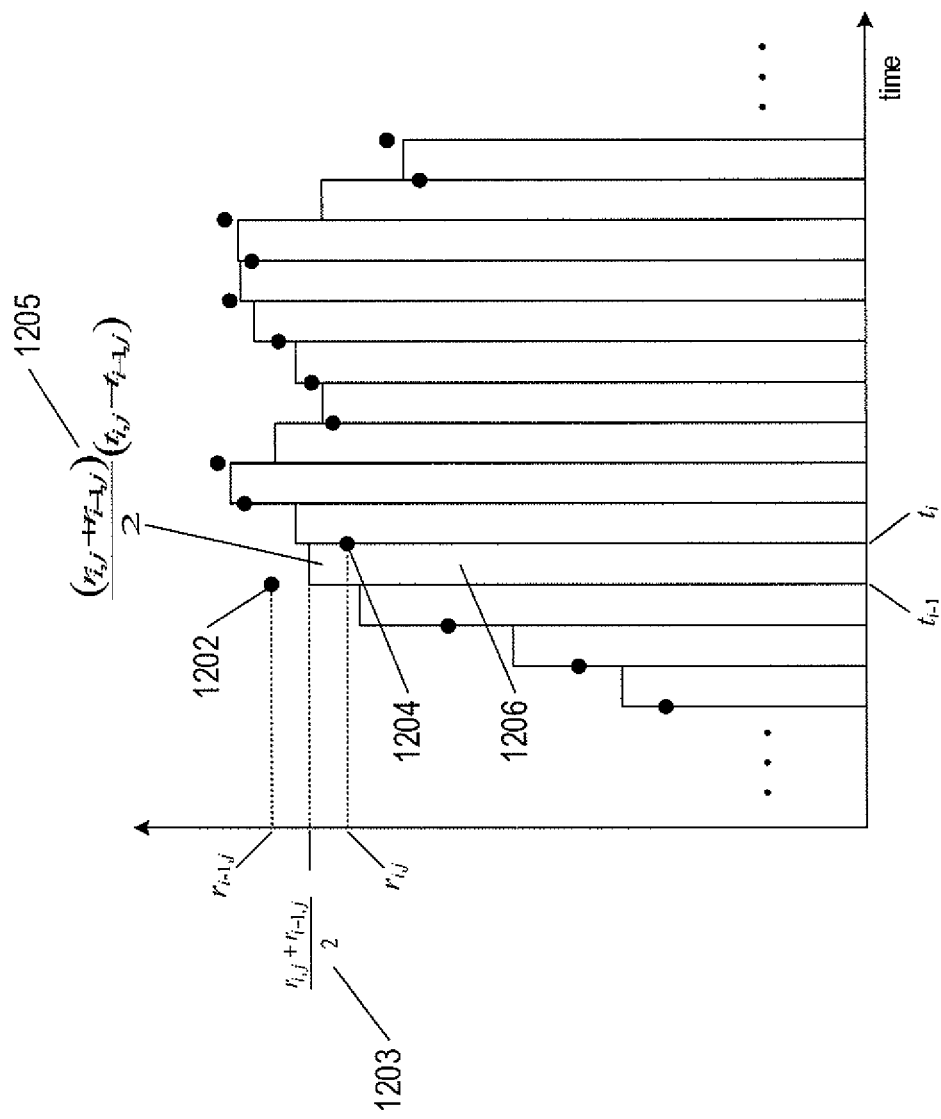
FIG. 12 shows a plot of example relative distances used to calculate an estimated total relative distance.

FIG. 12 shows an example plot of a few relative distances associated with an event $E_j$. Dots represent relative distances at corresponding time stamps. For example, dot 1202 represents a relative distance $r_{i-1,j}$ at time stamp $t_{i-1}$. The relative distances for the event $E_j$ are integrated over the duration of the event. FIG. 12 illustrates integration based on the average relative distance between two consecutive time stamps. For example, equation 1203 represents the average relative distance between relative distances 1202 and 1204. Each bar represents an area defined by the average relative distance between each pair of consecutive relative distances. For example, equation 1205 represents the area of bar 1206. The areas of the bars are summed to obtain an estimated total relative distance of the event $E_j$ as follows:

$$\psi_j \approx \frac{1}{2}\sum_{i=1}^{n_j}(r_{i,j} + r_{i-1,j})(t_{i,j} - t_{i-1,j}) \quad (44)$$

In order to incorporate the duration of the event into the total relative distance of the event, the estimated total relative distance of an event is divided by the number of time stamps to obtain a normalized total relative distance given by:

$$w_j = \frac{\psi_j}{n_j} \quad (45)$$

Division by the count $n_j$ in Equation (45) distinguishes between different types of events that may have nearly identical estimated total relative distances. For example, consider two example events $E_X$ and $E_Y$ that have nearly the same total relative distances represented by $\psi_X$ and $\psi_Y$, respectively (i.e., $\psi_X \approx \psi_Y$). The first event $E_X$ may be a narrow spike composed of a small number of large relative distances over a short event duration while the second event $E_Y$ may be a broad spike composed of large number of small relative distances over a long event duration (i.e., $n_X < n_Y$). Equation (45) distinguishes between these types of events by dividing by the time stamp count associated with each of the events. For example, because $n_X$ is smaller than $n_Y$, $w_X$ will be larger than $w_Y$. This way the variable of interest contains both the total relative distance associated with the event and also the time factor which can then provide a better representation of the event.

The median of the normalized total relative distances is calculated as follows:

$$\hat{w} = \hat{m}\{w_j; j=1,\ldots,J\} \quad (46)$$

where $\hat{m}$ is the median operator; and

J is the total number of upper and lower-threshold events. In practice, the median operator sorts the set $\{w_j\}_{j=1}^J$ and finds the $(J+1)/2$ rank value of the set $\{w_j\}_{j=1}^J$. The average of the normalized total relative distances is calculated as follows:

$$\bar{w} = \frac{1}{J}\sum_{j=1}^{J} w_j \quad (47)$$

Methods then compute a cumulative distribution that a current event $E_A$ generates an alert. The current event $E_A$ is composed of a number of data values that are either greater than an upper threshold or less than a lower threshold. The cumulative distribution is represented by $$\bar{p}(E_A|w_A) \quad (48)$$

where $w_A = \psi_A/n_A$ is the normalized total relative distance of the event $E_A$.

The quantity $n_A$ is a count of the number of time stamps of the relative distances (i.e., data values) that form the event $E_A$, and the estimated total relative distance $\psi_A$ of the current event $E_A$ is calculated as described above with reference to Equation (44) using the data values that comprise the event $E_A$.

The cumulative distribution given by Equation (48) is the estimated current degree of abnormality used to determine whether or not the event $E_A$ generates an alert. An alert may be generated when the cumulative distribution satisfies the following condition:

$$\bar{p}(E_A|w_A) > \gamma \quad (49)$$

where $0 < \gamma < 1$ is minimum threshold for generating an alert.

For example, 0.6 may be a suitable value for $\gamma$.

The cumulative distribution given by Equation (48) may be approximated by $$\bar{p}(E_A|w_A) = 1 - e^{-\left(\frac{w_A}{\beta}\right)^\alpha} \quad (50)$$

where $w_A > 0$.

The parameters $\alpha$ and $\beta$ in Equation (50) are related to the median $\hat{w}$ and the mean $\bar{w}$ calculated in Equations (46) and (47) as follows:

$$z \equiv \frac{1}{\alpha} \quad (51a)$$

$$\bar{w} = \beta\Gamma(1+z) \quad (51b)$$

and $$\hat{w} = \beta(\ln 2)^z \quad (51c)$$

where $\Gamma(1+z)$ is the Gamma function of $1+z$.

Using the following property of the Gamma function:

$$\Gamma(1+z) = z\Gamma(z) \quad (52)$$

the parameter $\alpha$ in Equation (51a) may be computed using a ratio:

$$w_r \equiv \frac{\bar{w}}{\hat{w}} = \frac{z\Gamma(z)}{(\ln 2)^z} \quad (53)$$

The quantity $w_r$ is typically non-linear and is calculated from the median $\hat{w}$ and the mean $\bar{w}$, which are computed as described above with reference to corresponding Equations (46) and (47). Equation (53) is then used to compute the value of z, which is used to compute the cumulative distribution parameters α and β according to Equations (51a)-(51c). After values have been determined for the parameters α and β, the cumulative distribution of the event $E_A$ given $w_A$ is computed using Equation (50). Table 1 shows an example of numerical values for $w_r$ and corresponding values computed for z from the values for $w_r$.

TABLE 1

| | | | $w_r$ | | | |
|---|---|---|---|---|---|---|
| 1.00 | 1.10 | 1.20 | 1.30 | 2.00 | 3.00 | 5.00 |
| z | 0.295 | 0.575 | 0.737 | 0.860 | 1.364 | 1.735 | 2.139 |

Although calculation of the cumulative distribution has been described above in general, in practice, the parameters of the cumulative distribution given by Equation (50) may be separately computed for upper-threshold events and lower-threshold events.

For the upper-threshold events in the historical time-series data, the total relative distance and normalized total relative distance associated with each upper-threshold event $E_j$ are denoted by $\psi_j^u$ and $w_j^u$ and computed according to Equations (44) and (45), respectively. The median of the upper-threshold events is computed according to Equation (46) and is denoted by $\hat{w}^u$ and the mean of the upper-threshold events is computed according to Equation (47) and is denoted by $\overline{w}^u$. An upper-threshold ratio $w_T^u$ is computed according to Equation (53), which in turn may be used to compute upper-threshold parameters $\alpha^u$ and $\beta^u$ that are used to compute an upper-threshold cumulative distribution. When the event $E_A$ is an upper-threshold event, an upper-threshold cumulative distribution may be computed as follows:

$$\overline{p}^u(E_A \mid w_A) = 1 - \exp\left(-\left(\frac{w_A}{\beta^u}\right)^{\alpha^u}\right) \quad (54)$$

For the lower-threshold events in the historical time-series data, the total relative distance and normalized total relative distance associated with each lower-threshold event $E_j$ are denoted by $\psi_j^l$ and $w_j^l$ and computed according to Equations (44) and (45), respectively. The median of the lower-threshold events is computed according to Equation (46) and is denoted by $\hat{w}^l$ and the mean of the lower-threshold events is computed according to Equation (47) and is denoted by $\overline{w}^l$. A lower-threshold ratio $w_r^l$ is computed according to Equation (53), which in turn may be used to compute lower-threshold parameters $\alpha^l$ and $\beta^l$ that are used to compute a lower-threshold cumulative distribution. When the event $E_A$ is a lower-threshold event, a lower-threshold cumulative distribution may be computed as follows:

$$\overline{p}^l(E_A \mid w_A) = 1 - \exp\left(-\left(\frac{w_A}{\beta^l}\right)^{\alpha^l}\right) \quad (55)$$

Figure 13:
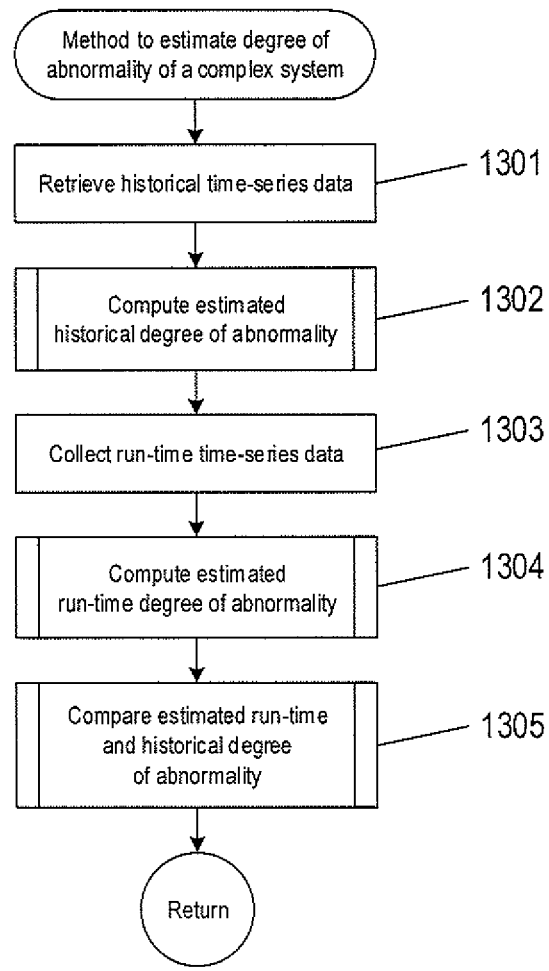
FIG. 13 shows a flow diagram of a method to estimate a degree of abnormality of a complex system.

FIG. 13 shows a flow diagram of a method to estimate a degree of abnormality of a complex system. In block 1301, historical time-series data that represents the past behavior, performance, or usage of a complex system is retrieved from a data-storage device. In block 1302, a routine "compute estimated historical degree of abnormality" is called as described below with reference to FIG. 14. In block 1303, current time-series data that represents the behavior, performance, or usage of the complex system is collected. In block 1304, a routine "computed estimated current degree of abnormality" is called as described below with reference to FIG. 16. In block 1305, a routine "compare estimated current and historical degrees of abnormality" is called to compare the results obtained from blocks 1302 and 1304 as described below with reference to FIG. 17.

Figure 14:
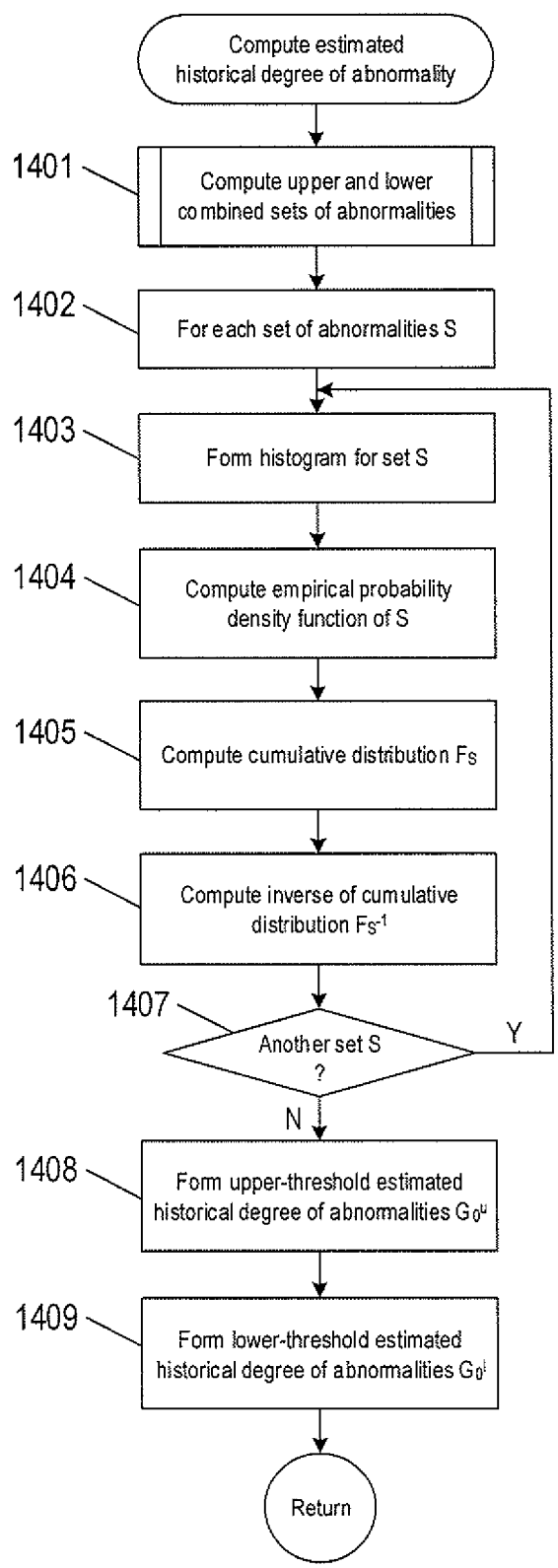
FIG. 14 shows a control-flow diagram of the routine "compute estimated historical degree of abnormality" called in FIG. 13.

FIG. 14 shows a control-flow diagram of the routine "compute estimated historical degree of abnormality" called in block 1302 of FIG. 13. In block 1401, a routine "compute upper and lower combined sets of abnormalities" is called as described below with reference to FIG. 15. A for-loop in block 1402, repeats the operations of blocks 1403-1407 for each set of abnormalities S in the upper and lower combined sets of abnormalities determined in block 1401. For example, the set of abnormalities S may represent the set of historical upper-threshold event distances $D^u$ in Equation (4). In block 1403, a histogram of the set S is formed as described above with reference to FIG. 5. In block 1404, an empirical probability distribution is computed for the set S based on the histogram formed in block 1403, as described above with reference to FIG. 5. In block 1405, a cumulative distribution is computed based on the empirical probability distribution, as described above with reference to FIG. 6. In one implementation, the cumulative distribution may be an empirical cumulative distribution computed as described above with reference to Equation (27). In another implementation, the cumulative distribution may be a parametric cumulative distribution obtained as described above with reference to Equations (30)-(34). In block 1406, an inverse of the cumulative distribution is computed as described above with reference Equations (28) and (35). In decision block 1407, the operations represented by blocks 1403-1406 are repeated for each set of abnormalities. In block 1408, an upper-threshold estimated historical degree of abnormality, described above with reference to Equations (24a), (24b), (25a) and (25b), is formed. In block 1409, a lower-threshold estimated historical degree of abnormality, described above with reference to Equations (24c), (24d), (25c) and (25d), is formed.

Figure 15:
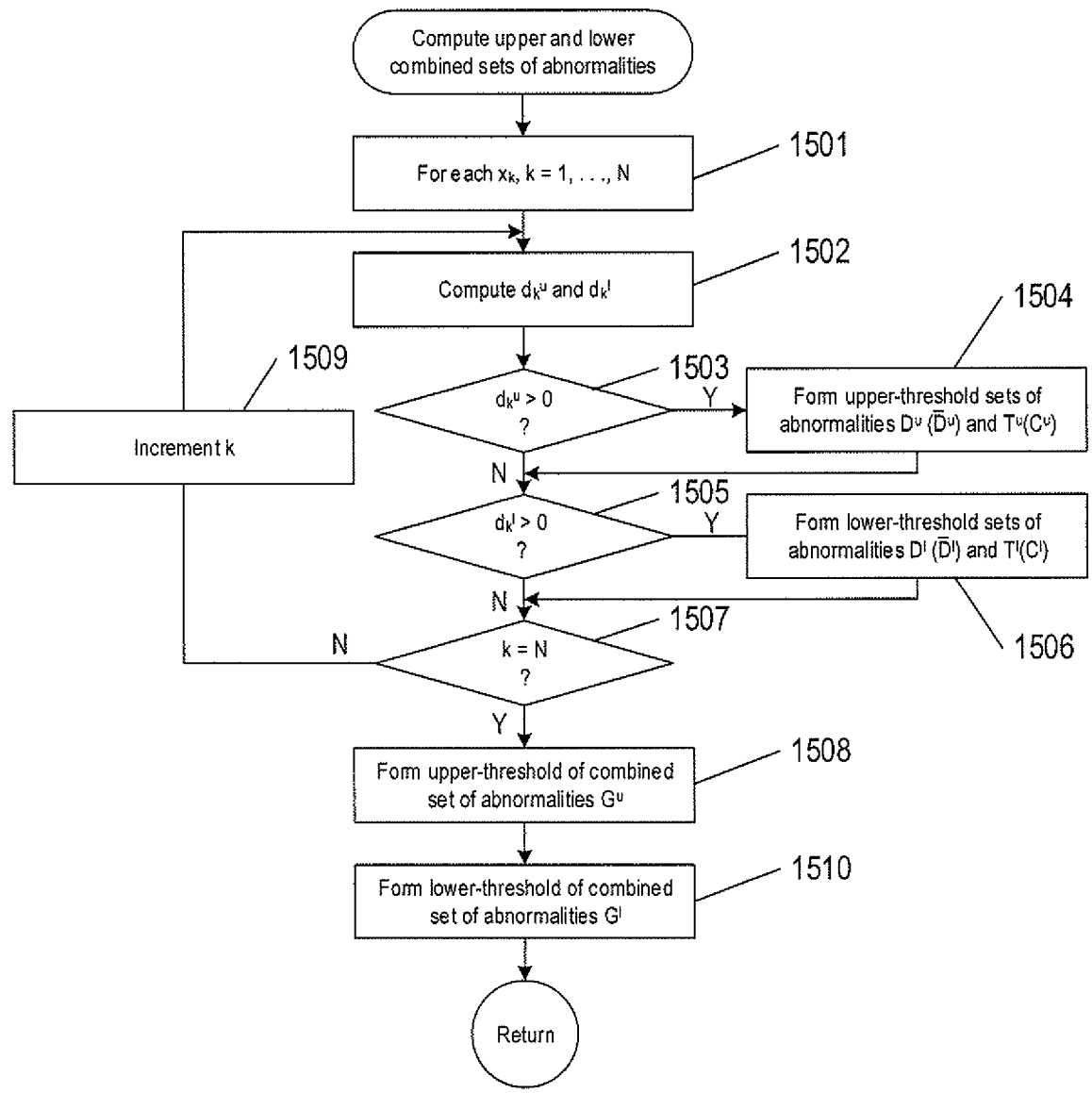
FIG. 15 shows a control-flow diagram of the routine "compute upper and lower combined sets of abnormalities" called in FIG. 14.

FIG. 15 shows a control-flow diagram of the routine "compute upper and lower combined sets of abnormalities" called in block 1401 of FIG. 14. A for-loop in block 1501 repeats the operations represented by blocks 1502-1508 for each data in the historical time-series data. In block 1502, distances are computed as described above with reference to Equations (2) and (3). In decision block 1503, when the distance $d_k^u$ computed according to Equation (2) is greater than zero, control flows to block 1504, otherwise control flows to block 1505. In decision block 1505, when the distance $d_k^l$ computed according to Equation (3) is greater than zero, control flows to block 1506. In block 1504, distances $d_k^u$ may be collected to form the set $D^u$ as described above with reference to Equation (4). Alternatively, distances may be used to compute a set of distance metrics $D_0^u$ as described above with reference to Equations (6)-(8). The durations of the upper threshold events are collected to form the set $T^u$ described above with reference to Equation (12). Alternatively, a set of event counts $C^u$ may be formed, as described above with reference to Equation (18). In block 1506, distances $d_k^l$ may be collected to form the set $D^l$ as described above with reference to Equation (5). Alternatively, distances may be used to compute a set of distance metrics $\overline{D}^l$ as described above with reference to Equations (9)-(11). The durations of the lower threshold events are collected to form the set $T^l$, as described above with reference to Equation (13). Alternatively, a set of event counts are collected to form $C^l$, as described above with reference to Equation (19). In decision block 1507, when the index k equals N control flows control flows to block 1508, otherwise, control flows to block 1509 in which k is incremented and the operations associated with blocks 1502-1506 are repeated. In block 1508, a upper-threshold of combined sets of abnormalities $G^u$ is formed. In block 1510, a lower-threshold of combined sets of abnormalities $G^l$ is formed.

Figure 16:
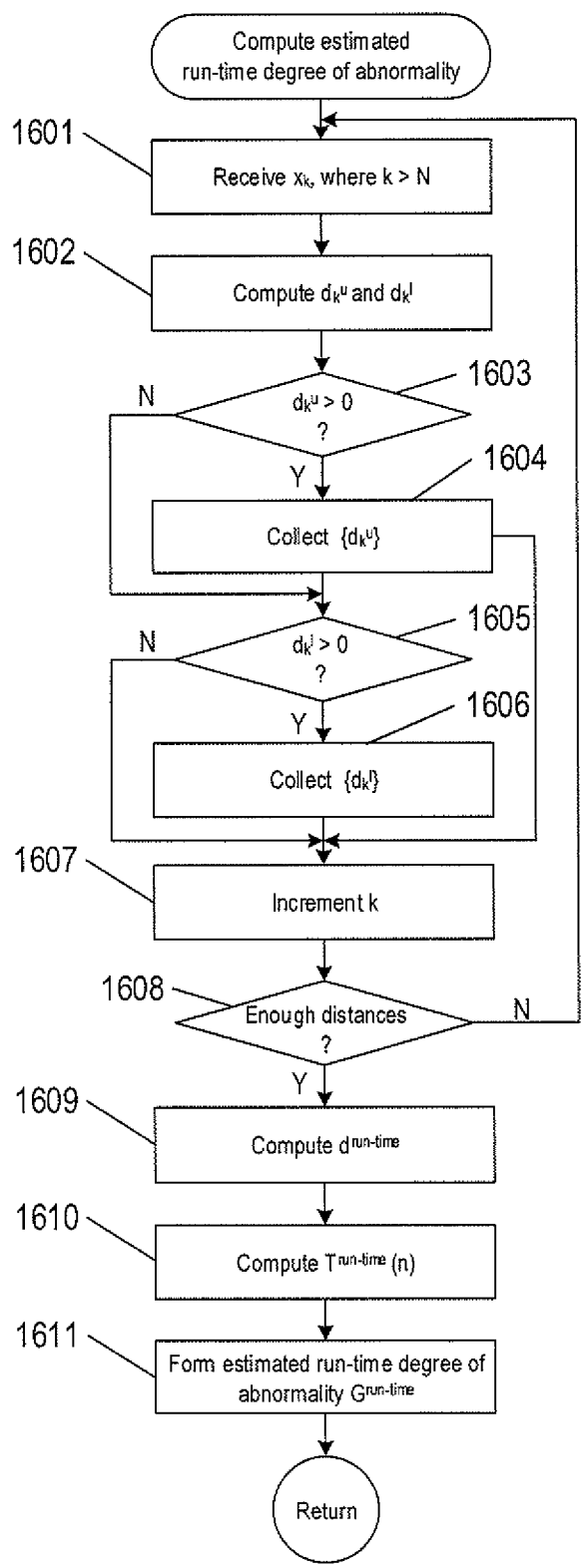
FIG. 16 shows control-flow diagram of the routine "compute estimated current degree of abnormality" called in FIG. 13.

FIG. 16 shows control-flow diagram of the routine "compute estimated current degree of abnormality" called in block 1304 of FIG. 13. In block 1601, a data value $x_k$ of current time-series data is received. In block 1602, distances $d_k^u$ and $d_k^l$ are computed as described above with reference to Equations (2) and (3). In decision block 1603, when $d_k^u$ is greater than zero, control flows to block 1604, otherwise, control flows to decision block 1605. In block 1604, the distances $d_k^u$ greater than zero are collected to form a set of distances $\{d_k^u\}$ and an upper-threshold event is created. In block 1606, the distances $d_k^l$ greater than zero are collected to form a set of distances $\{d_k^l\}$ and a lower-threshold event is created. In block 1607, the index k is incremented. In decision block 1608, when enough distances have collected in either the set $\{d_k^u\}$ or the set $\{d_k^l\}$, control flows to block 1609, otherwise, the operations represented by blocks 1601-1608 are repeated for another current data value. In block 1609, a current distance metric is computed as described above with reference to Equation (38). In block 1610, a current duration $T^{run-time}$ is determined as described above with reference to Equation (40). Alternatively, a current count, n, is determined as described above with reference to Equation (39). In block 1611, an estimated current degree of abnormality $G^{run-time}$ is formed as described above with reference to Equation (40). Alternatively, an estimated current degree of abnormality $G^{run-time}$ is formed as described above with reference to Equation (39).

Figure 17:
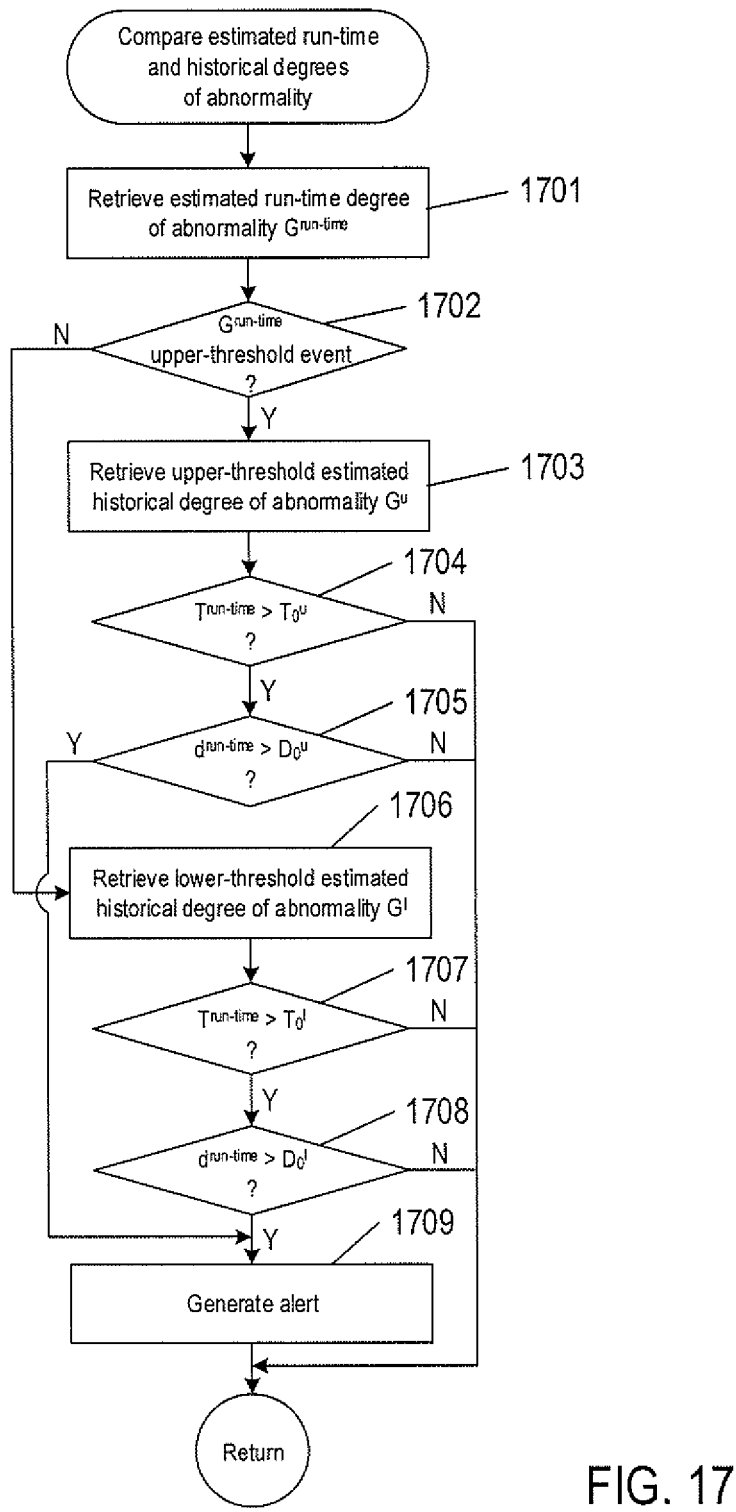
FIG. 17 shows a control-flow diagram of the routine "compare estimated current and historical degrees of abnormality" called in FIG. 13.

FIG. 17 shows a control-flow diagram of the routine "compare estimated current and historical degrees of abnormality" called in block 1305 of FIG. 13. In block 1701, the estimate current degree of abnormality $G^{run-time}$ formed in block 1611 of FIG. 16 is retrieved from a data-storage device. In decision block 1702, when the estimate current degree of abnormality $G^{run-time}$ corresponds to an upper-threshold event in the current time-series data, control flows to block 1703, otherwise, control flows to block 1706. In block 1703, the upper-threshold estimated historical degree of abnormality $G_0^u$ formed in block 1408 of FIG. 14 is retrieved from a data-storage device. In decision block 1704, when current duration $T^{run-time}$ is greater than $T_0^u$, control flows to decision block 1705. In decision block 1705, when current distance $d^{run-time}$ is greater than $D_0^u$, control flows to block 1709 and an alert may be generated. In block 1706, the lower-threshold estimated historical degree of abnormality $G_0^l$ formed in block 1409 of FIG. 14 is retrieved from a data-storage device. In decision block 1707, when current duration $T^{run-time}$ is greater than $T_0^l$, control flows to decision block 1708. In decision block 1708, when current distance $d^{run-time}$ is greater than $D_0^l$, control flows to block 1709 and an alert may be generated. Note that decision blocks 1704, 1705, 1707, and 1708 may have been implemented using any pair of sets of abnormalities formed in blocks 1504 and 1506.

Figure 18:
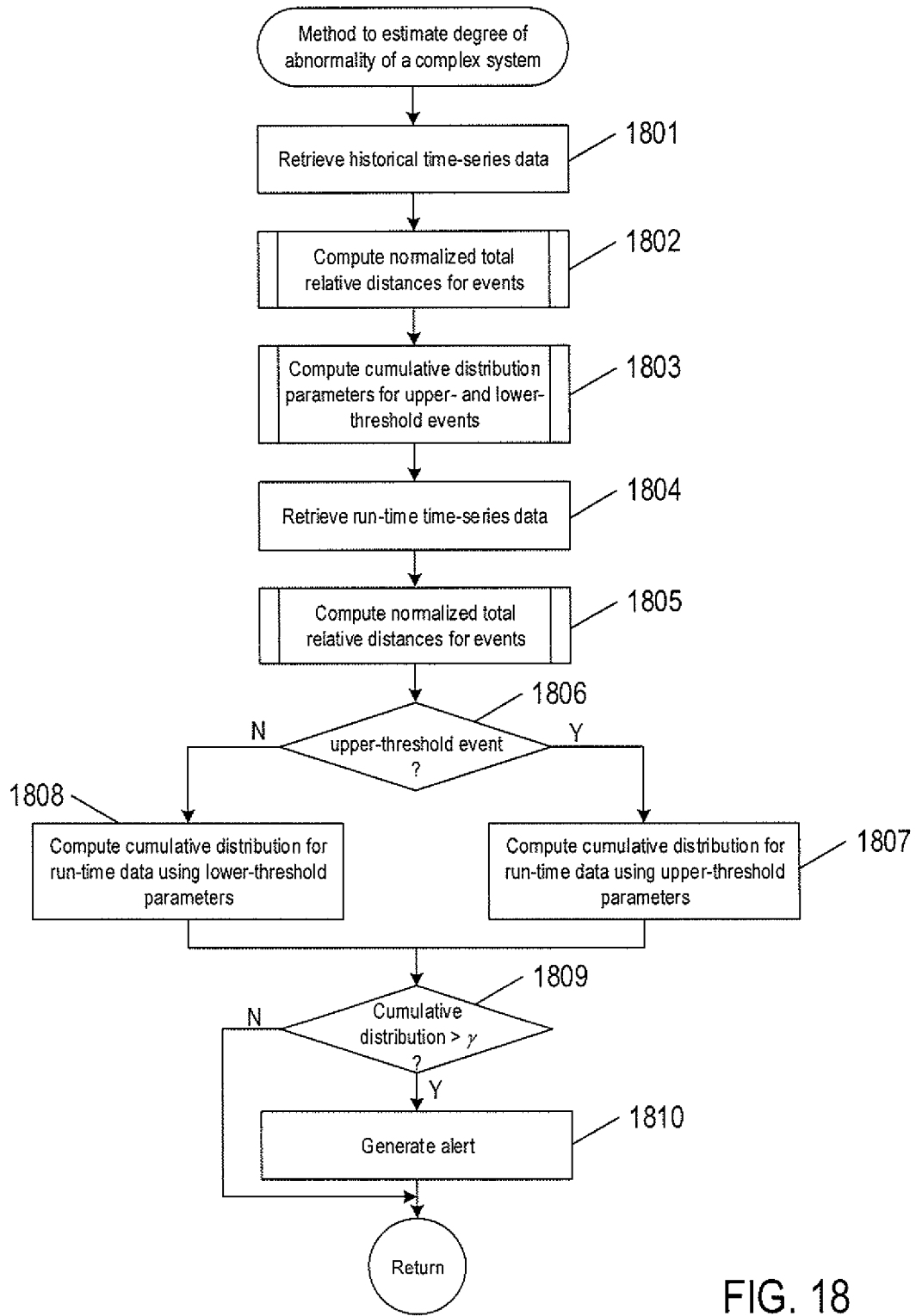
FIG. 18 shows a flow diagram of a method to estimate a degree of abnormality of a complex system.

FIG. 18 shows a control-flow diagram of a method to estimate a degree of abnormality of a complex system. In block 1801, historical time-series data that represents the historical behavior, performance, or usage of a complex system is retrieved from a data-storage device. In block 1802, a routine "compute normalized total relative distances for each event" is called to compute normalized total relative distances for upper- and lower-threshold events in the historical time-series data as described below with reference to FIG. 19. In block 1803, a routine "compute cumulative distribution parameters for upper- and lower-threshold events" is as described below with reference to FIG. 20. In block 1804, current time-series data that represents the current behavior, performance, or usage of a complex system is retrieved from a data-storage device. In block 1805, the routine "compute normalized total relative distances for each event" is called to compute a normalized total relative distances for an upper- or lower-threshold event in the current time-series data as described below with reference to FIG. 19. In decision block 1806, when an event in the current time-series data is an upper-threshold event, control flows to block 1807. Otherwise, the event is a lower-threshold event and control flows to block 1808. In block 1807, a cumulative distribution is computed according to Equation (54). In block 1808, a cumulative distribution is computed according to Equation (55). In decision block 1809, when the cumulative distribution is greater than a threshold as described above with reference to Equation (49), control flows to block 1810 and an alert is generated.

Figure 19:
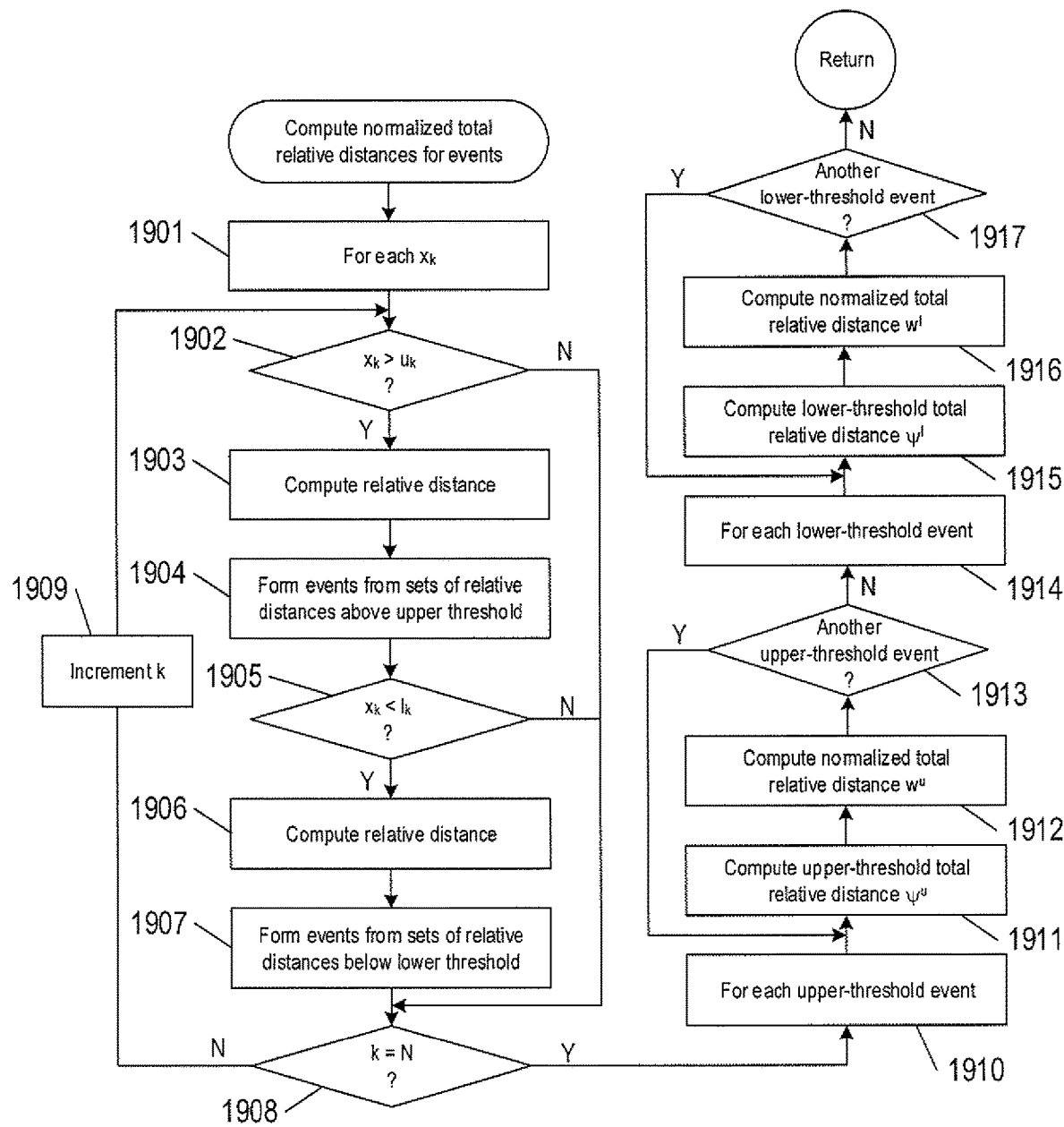
FIG. 19 shows a control-flow diagram of the routine "compute normalized total relative distance for each event" called in FIG. 18.

FIG. 19 shows a control-flow diagram of the routine "compute normalized total relative distance for each event" called in blocks 1802 and 1805 of FIG. 18. A for-loop beginning in block 1901 repeats the operations represented by blocks 1902-1909 for each data value in time-series data. In decision block 1902, when a data value $x_k$ is greater than a corresponding upper threshold $u_k$ for the same time stamp $t_k$, control flows to block 1903. Otherwise, control flows to decision block 1905. In block 1903, a relative distance is computed as described above with reference to Equation (41). In block 1904, events are formed from the relative distances as described above with reference to the set (43). In decision block 1905, when a data value $x_k$ is less than a corresponding lower threshold $l_k$ for the same time stamp $t_k$, control flows to block 1906. In block 1903, a relative distance is computed as described above with reference to Equation (42). In block 1907, events are formed from the relative distances as described above with reference to the (43). In decision block 1908, when the iteration index k equals the number of data values N in the historical time-series data, control flows to block 1910, otherwise, control flows to block 1909 in which the index k is incremented and the operations associated with blocks 1902-1908 are repeated. A for-loop beginning with block 1910 repeats the operations represented by blocks 1911-1913 for each upper-threshold event. In block 1911, a total relative distance is computed each upper-threshold event as described above with reference to Equation (44). In block 1912, a normalized total relative distance is computed as described above with reference to Equation (45). In decision block 1913, the operations represented by blocks 1911 and 1912 are repeated for each upper-threshold event. A for-loop beginning with block 1914 repeats the operations represented by blocks 1915-1917 for each lower-threshold event. In block 1915, a total relative distance is computed each lower-threshold event as described above with reference to Equation (44). In block 1916, a normalized total relative distance is computed as described above with reference to Equation (45). In decision block 1917, the operations represented by blocks 1915 and 1916 are repeated for each lower-threshold event.

Figure 20:
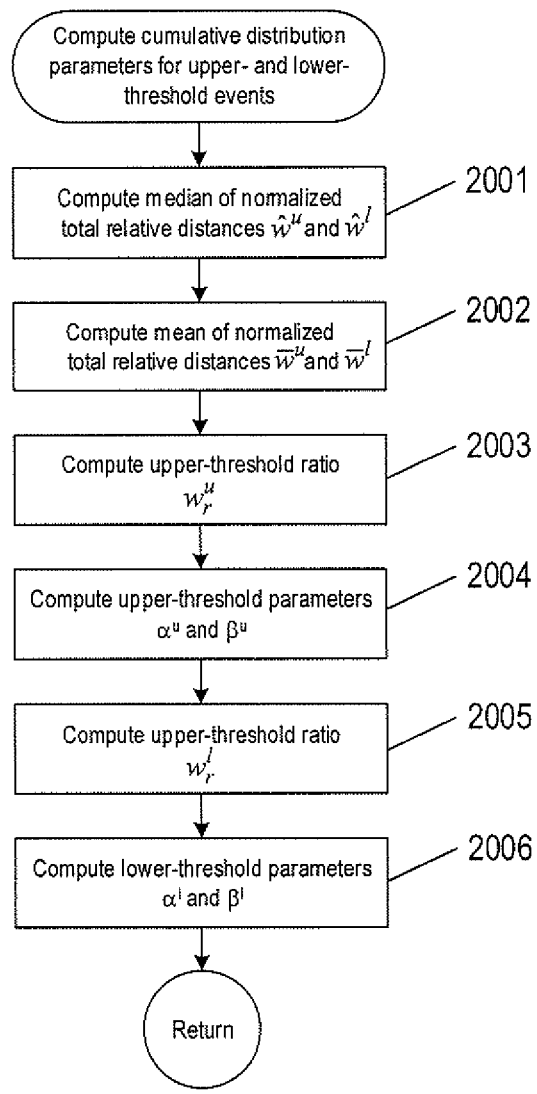
FIG. 20 shows a flow diagram of the routine "compute cumulative distribution parameters for upper- and lower-threshold events" called in FIG. 18.

FIG. 20 shows a flow diagram of the routine "compute cumulative distribution parameters for upper- and lower-threshold events" called in block 1803 of FIG. 18. In block 2001, medians $\hat{w}^u$ and $\hat{w}^l$ of the upper and lower normalized total relative distances are computed according to Equation (46). In block 2002, means $\overline{w}^u$ and $\overline{w}^l$ of the upper and lower normalized total relative distances are computed according to Equation (47). In block 2003, an upper-threshold ratio $w_r^u$ is computed as described above with reference to Equation (53) from the upper-threshold median $\hat{w}^u$ and mean $\overline{w}^u$. In block 2004, the upper-threshold parameters $\alpha^u$ and $\beta^u$ based on the upper-threshold ratio $w_r^u$. In block 2005, an lower-threshold ratio $w_r^l$ is computed as described above with reference to Equation (53) from the lower-threshold median $\hat{w}^l$ and mean $\overline{w}^l$. In block 2006, the lower-threshold parameters $\alpha^l$ and $\beta^l$ based on the lower-threshold ratio $w_r^l$.

It should be noted that the currently disclosed computational methods and systems are directed to real, tangible, physical systems and the methods carried out within physical systems, including client computers and server computers. Those familiar with modern science and technology well appreciate that, in modern computer systems and other processor-controlled devices and systems, the control components are often fully or partially implemented as sequences of computer instructions that are stored in one or more electronic memories and, in many cases, also in one or more mass-storage devices, and which are executed by one or more processors. As a result of their execution, a processor-controlled device or system carries out various operations, generally at many different levels within the device or system, according to control logic implemented in the stored and executed computer instructions. Computer-instruction-implemented control components of modern processor-controlled devices and systems are as tangible and physical as any other component of the system, including power supplies, cooling fans, electronic memories and processors, and other such physical components.

Figure 21:
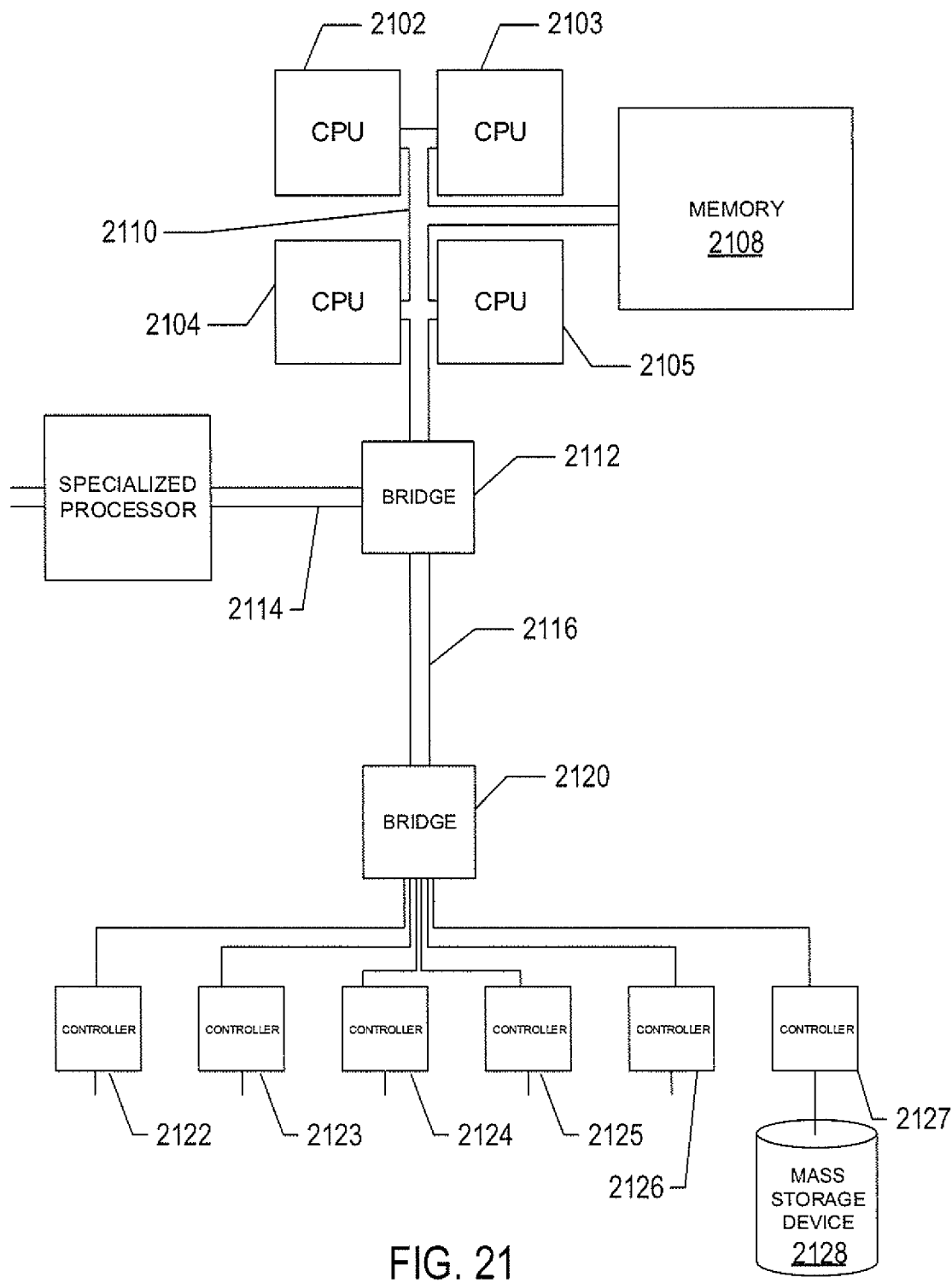
FIG. 21 shows an example of a computer system that executes efficient methods of determining a degree of abnormality of complex system based on time-series data.

FIG. 21 shows an example of a computer system that executes efficient methods of determining a degree of abnormality of complex system based on time-series data. The internal components of many small, mid-sized, and large computer systems as well as specialized processor-based storage systems can be described with respect to this generalized architecture, although each particular system may feature many additional components, subsystems, and similar, parallel systems with architectures similar to this generalized architecture. The computer system contains one or multiple central processing units ("CPUs") 2102-2105, one or more electronic memories 2108 interconnected with the CPUs by a CPU/memory-subsystem bus 2110 or multiple busses, a first bridge 2112 that interconnects the CPU/memory-subsystem bus 2110 with additional busses 2114 and 2116, or other types of high-speed interconnection media, including multiple, high-speed serial interconnects. The busses or serial interconnections, in turn, connect the CPUs and memory with specialized processors, such as a graphics processor 2118, and with one or more additional bridges 2120, which are interconnected with high-speed serial links or with multiple controllers 2122-2127, such as controller 2127, that provide access to various different types of computer-readable media, such as computer-readable medium 2128, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2128 is a data-storage device, including electronic memory, optical or magnetic disk drive, USB drive, flash memory and other such data-storage devices. The computer-readable medium 2128 can be used to store machine-readable instructions that encode the computational methods described below and can be used to store encoded data, during store operations, and from which encoded data can be retrieved, during read operations, by computer systems, data-storage systems, and peripheral devices.

Numerical Results

Figure 22:
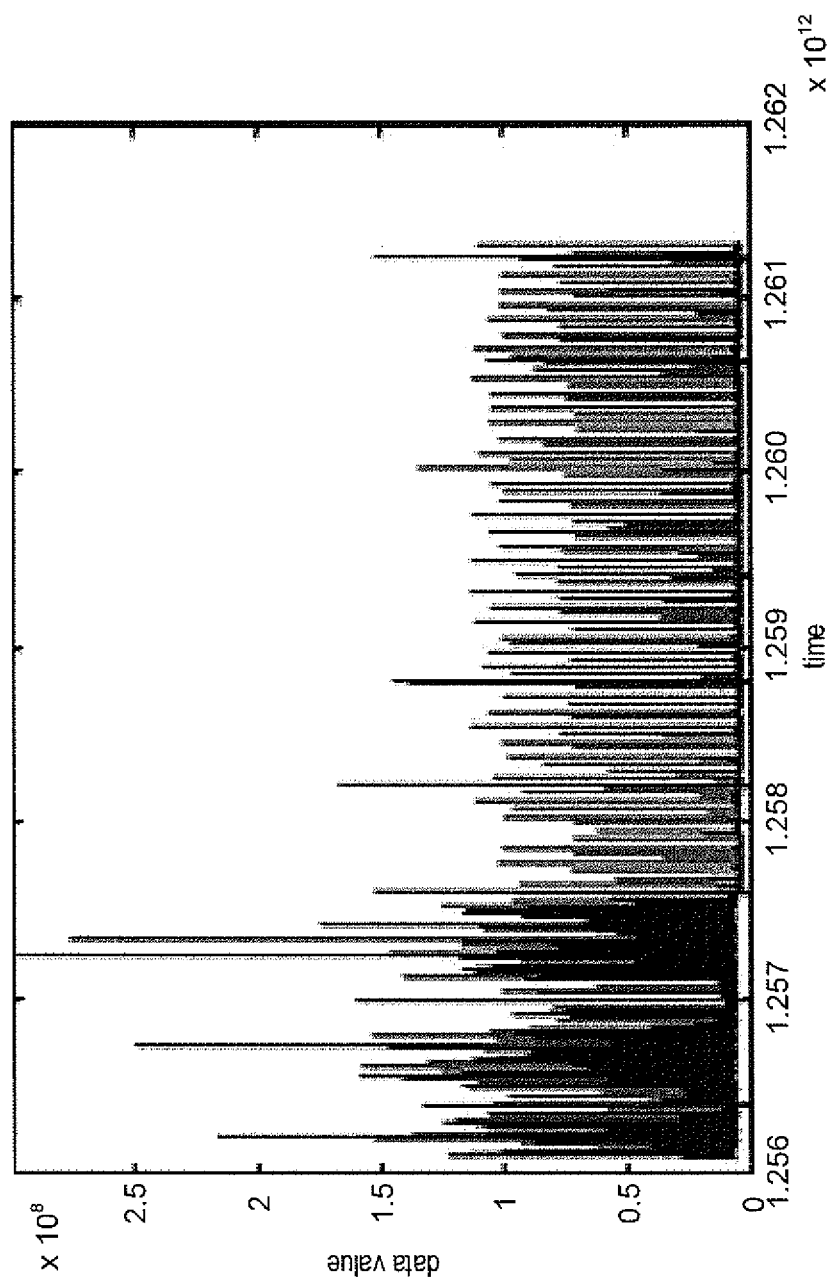
FIGS. 22-26 show an example of actual numerical results computed for historical time-series data.
Figure 23:
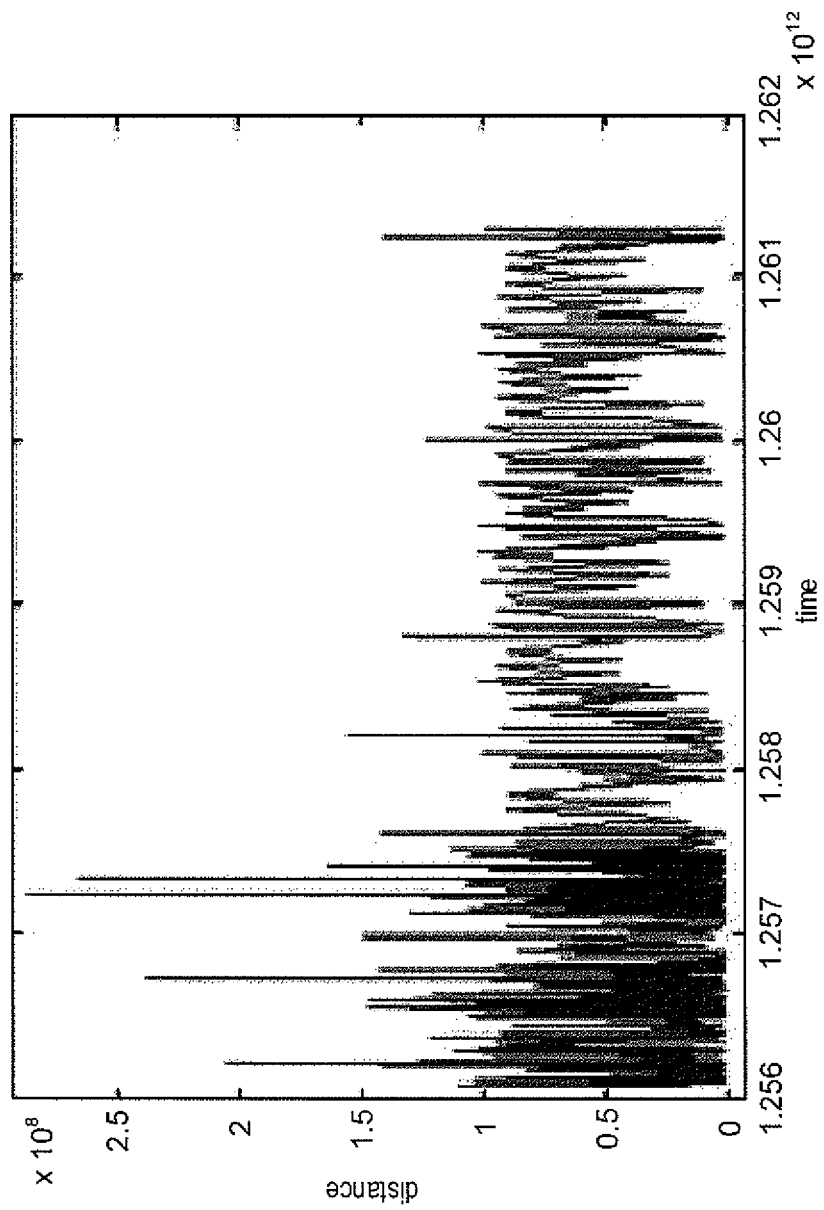
Figure 24:
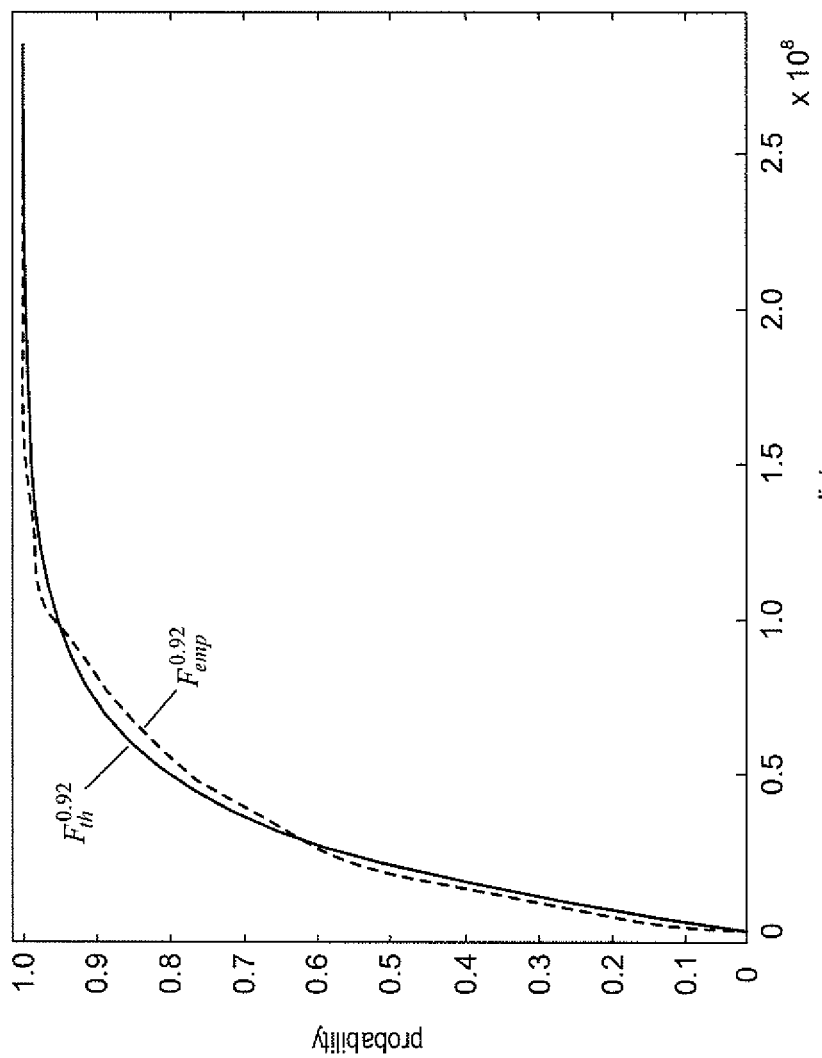
Figure 25:
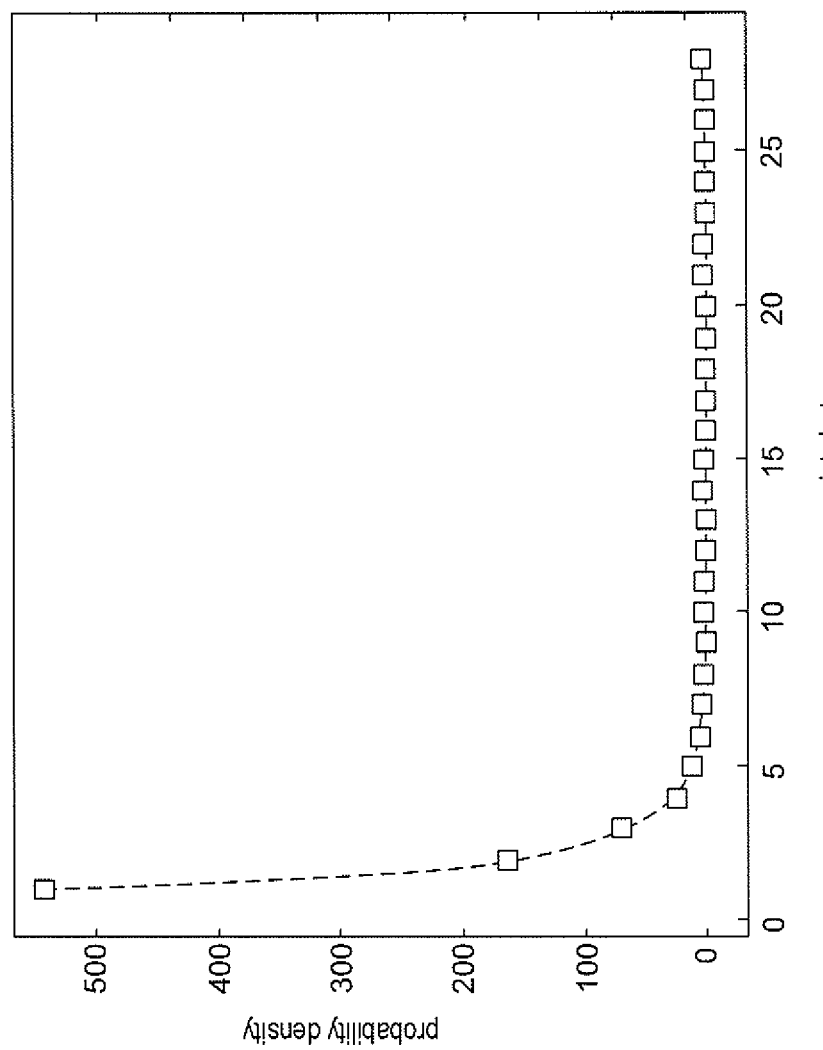
Figure 26:
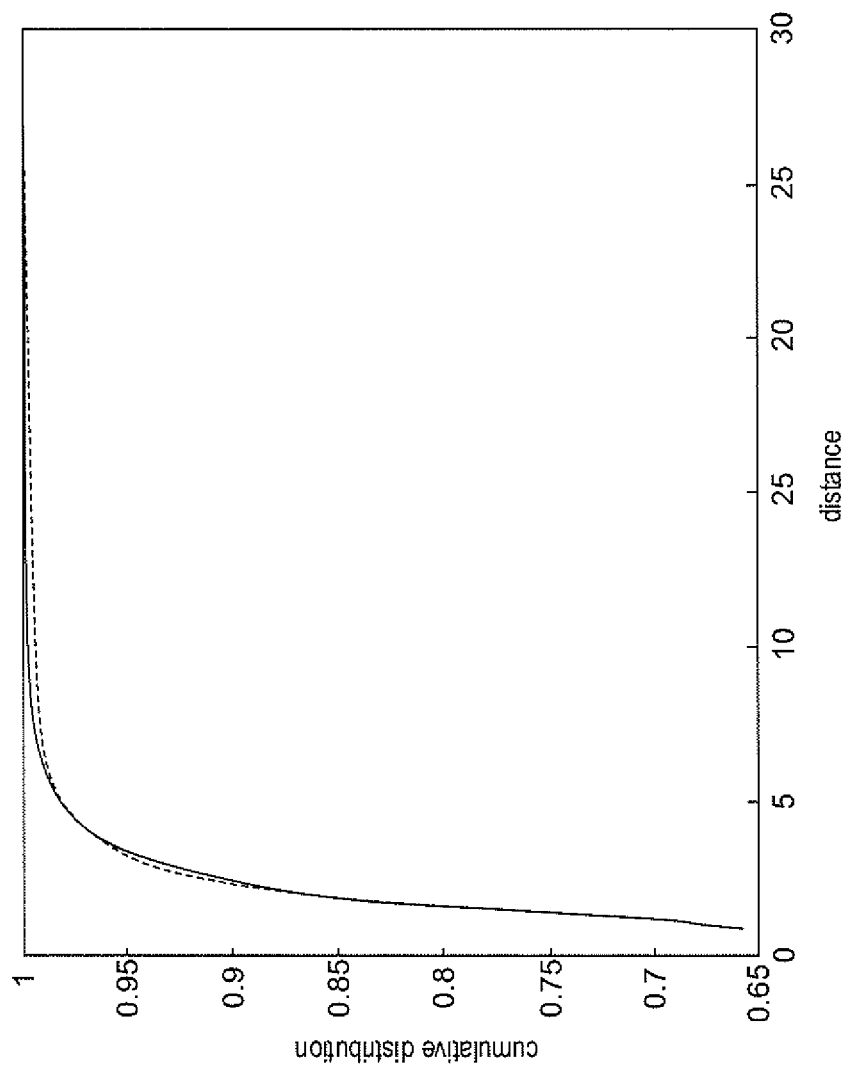

FIG. 22 shows actual historical time-series data. The corresponding distances are shown in FIG. 23. FIG. 24 shows an empirical and a parametric cumulative distributions (i.e., cumulative distribution in Equation (20)) computed for the distance shown in FIG. 23 with cumulative distribution parameters $\gamma=-0.0588$ and $\sigma=2.97\cdot 10^7$. A relative mean square error for this fit is less than 0.1 (actually equal to 0.82) then the fit is satisfactory and may be used for further analysis. FIG. 24 shows the density function of n-point alerts. FIG. 26 shows the empirical cumulative distribution (dashed curve) and parametric distribution (solid curve) (i.e., cumulative distribution in Equation (20)) with parameters $\gamma=-0.2$ and $\sigma=0.82$. The fit is again satisfactory with a relative error equal to 0.04.

Assuming an alert in the on-line mode, where the third point (n=3) violates the threshold by some distance (d=100, 000). Parametric cumulative distributions gave a probability vector (0.003, 0.936), which means that the distance is not dangerous but the number of sequential data values that violate the threshold is dangerous. Based on this estimate the user can be informed about the abnormality or not.

It is appreciated that the various implementations described herein are intended to enable any person skilled in the art to make or use the present disclosure. Various modifications to these implementations will be readily apparent to those skilled in the art, and the generic principles defined herein may be applied to other implementations without departing from the spirit or scope of the disclosure. For example, any of a variety of different implementations can be obtained by varying any of many different design and development parameters, including programming language, underlying operating system, modular organization, control structures, data structures, and other such design and development parameters. Thus, the present disclosure is not intended to be limited to the implementations described herein but is to be accorded the widest scope consistent with the principles and novel features disclosed herein.

The invention claimed is:

1. A method stored in one or more data-storage devices and executed using one or more processors of a computer system to identify abnormal behavior of a virtual machine, the method comprising:
    retrieving historical time-series data that represents one of past behavior, performance, and usage of the virtual machine from a data-storage device;
    retrieving current time-series data that represents one of current behavior, performance, and usage of the virtual machine from a data-storage device;
    computing estimated upper-threshold and lower-threshold historical degrees of abnormality based on the historical time-series data;
    computing estimated current degree of abnormality based on the current time-series;
    comparing the estimated current degree of abnormality with one of the estimated upper-threshold and lower-threshold historical degrees of abnormality to determine whether one of the current behavior, performance, and usage of the virtual machine is abnormal; and displaying an alert on a visual display screen in response to the virtual machine experiencing the abnormal behavior, performance, or usage, the alert indicating an out-of-control process of the virtual machine.

2. The method of claim 1, wherein computing the estimated historical degree of abnormality further comprises computing upper and lower combined sets of abnormalities based on the historical time-series data;

for each set of abnormalities,
forming a histogram of the set of abnormalities;
computing an empirical probability density function based on the histogram;
computing a cumulative distribution based on the empirical probability;
computing an inverse empirical cumulative distribution based on the empirical cumulative distribution, the inverse empirical cumulative distribution is one of an upper-threshold abnormality degree component of the upper-threshold historical degree of abnormality and a lower-threshold abnormality degree component of the lower-threshold historical degree of abnormality;

forming the upper-threshold estimated historical degree of abnormality based the upper-threshold abnormality degree components; and forming the lower-threshold estimated historical degree of abnormality based the lower-threshold abnormality degree components.

3. The method of claim 2, wherein computing the upper and lower combined sets of abnormalities further comprises:

forming upper-threshold combined set of abnormalities, the upper-threshold combined set of abnormalities having one of a set of historical upper-threshold event distances and a set of historical upper-threshold distance metrics and one of a set of historical upper-threshold event durations and a set of historical upper-threshold event counts; and forming lower-threshold combined set of abnormalities, the upper-threshold combined set of abnormalities having one of a set of historical lower-threshold event distances and a set of historical lower-threshold distance metrics and one of a set of historical lower-threshold event durations and a set of historical lower-threshold event counts.

4. The method of claim 2, wherein the cumulative distribution further comprises one of an empirical cumulative distribution and a parametric cumulative distribution.

5. The method of claim 1, wherein computing the estimated current degree of abnormality further comprises:

computing a current distance metric for data values of the current time-series that violates one of an upper threshold and a lower threshold;

computing one of a current count and a current duration of the data values of the current time-series that violates one of an upper threshold and a lower threshold; and forming the estimated current degree of abnormality based on the current distance metric and one of the current count and the current duration.

6. The method of claim 1, wherein comparing the estimated current degree of abnormality with one of the estimated upper-threshold and lower-threshold historical degrees of abnormality further comprises:

when the estimated current degree of abnormality corresponds to an upper-threshold event, comparing the estimated current degree of abnormality with the estimated upper-threshold historical degree of abnormality;

when the estimated current degree of abnormality corresponds to a lower-threshold event, comparing the estimated current degree of abnormality with the estimated lower-threshold historical degree of abnormality; and generating an alert when a current distance metric and one of a current count and a current duration of the estimated current degree of abnormality are greater than the abnormality degree components one of the upper-threshold historical degree of abnormality and lower-threshold degree of historical degree of abnormality.

7. A system to identify abnormal behavior of a virtual machine, the system comprising:

one or more processors;
one or more data-storage devices;
a visual display screen; and
machine-readable instructions stored in the one or more data-storage devices that when executed using the one or more processors controls the system to perform operations comprising:

retrieving historical time-series data that represents one of past behavior, performance, and usage of the virtual machine from the one or more data-storage device;

retrieving current time-series data that represents one of current behavior, performance, and usage of the virtual machine from the one or more data-storage device;

computing estimated upper-threshold and lower-threshold historical degrees of abnormality based on historical time-series data;

computing estimated current degree of abnormality based on current time-series data;

comparing the estimated current degree of abnormality with one of the estimated upper-threshold and lower-threshold historical degrees of abnormality to determine whether one of the current behavior, performance, and usage of the virtual machine is abnormal; and displaying an alert on the visual display screen in response to the virtual machine experiencing the abnormal behavior, performance, or usage, the alert indicating an out-of-control process of the virtual machine.

8. The system of claim 7, wherein computing the estimated historical degree of abnormality further comprises computing upper and lower combined sets of abnormalities based on the historical time-series data;

for each set of abnormalities,
forming a histogram of the set of abnormalities;
computing an empirical probability density function based on the histogram;
computing a cumulative distribution based on the empirical probability;
computing an inverse empirical cumulative distribution based on the empirical cumulative distribution, the inverse empirical cumulative distribution is one of an upper-threshold abnormality degree component of the upper-threshold historical degree of abnormality and a lower-threshold abnormality degree component of the lower-threshold historical degree of abnormality;

forming the upper-threshold estimated historical degree of abnormality based the upper-threshold abnormality degree components; and forming the lower-threshold estimated historical degree of abnormality based the lower-threshold abnormality degree components.

9. The method of claim 8, wherein computing the upper and lower combined sets of abnormalities further comprises:
   forming upper-threshold combined set of abnormalities, the upper-threshold combined set of abnormalities having one of a set of historical upper-threshold event distances and a set of historical upper-threshold distance metrics and one of a set of historical upper-threshold event durations and a set of historical upper-threshold event counts; and
   forming lower-threshold combined set of abnormalities, the upper-threshold combined set of abnormalities having one of a set of historical lower-threshold event distances and a set of historical lower-threshold distance metrics and one of a set of historical lower-threshold event durations and a set of historical lower-threshold event counts.

10. The method of claim 8, wherein the cumulative distribution further comprises one of an empirical cumulative distribution and a parametric cumulative distribution.

11. The method of claim 7, wherein computing the estimated current degree of abnormality further comprises:
    computing a current distance metric for data values of the current time-series that violates one of an upper threshold and a lower threshold;
    computing one of a current count and a current duration of the data values of the current time-series that violates one of an upper threshold and a lower threshold; and
    forming the estimated current degree of abnormality based on the current distance metric and one of the current count and the current duration.

12. The method of claim 7, wherein comparing the estimated current degree of abnormality with one of the estimated upper-threshold and lower-threshold historical degrees of abnormality further comprises:
    when the estimated current degree of abnormality corresponds to an upper-threshold event, comparing the estimated current degree of abnormality with the estimated upper-threshold historical degree of abnormality;
    when the estimated current degree of abnormality corresponds to a lower-threshold event, comparing the estimated current degree of abnormality with the estimated lower-threshold historical degree of abnormality; and
    generating an alert when a current distance metric and one of a current count and a current duration of the estimated current degree of abnormality are greater than the abnormality degree components one of the upper-threshold historical degree of abnormality and lower-threshold degree of historical degree of abnormality.

13. A method stored in one or more data-storage devises and executed using one or more processors of a computer system to identify abnormal behavior of a virtual machine, the method comprising:
    retrieving historical time-series data that represents one of past behavior, performance, and usage of the virtual machine from the one or more data-storage device;
    retrieving current time-series data that represents one of current behavior, performance, and usage of the virtual machine from the one or more data-storage device;
    determining upper-threshold events and lower-threshold event in the historical time-series data;
    for each upper and lower threshold event,
        computing a normalized total relative distance,
        computing a median of the normalized total relative distances, and
        computing a mean of the normalized total relative distances;
    computing one of an upper-threshold cumulative distribution and lower-threshold cumulative distribution for the current time-series data based on the median and mean of the normalized total relative distance, the cumulative distribution is the estimate of the degree of abnormality; and
    displaying an alert on a visual display screen in response to the cumulative distribution of the current upper-threshold event or the current lower-threshold event being greater than a threshold, the alert indicating an out-of-control process of the virtual machine.

14. The method of claim 13, wherein determining the upper-threshold events in the historical time-series data further comprises:
    for each data value of the historical time-series greater than the upper threshold, computing a relative distance; and
    forming an upper-threshold event, each upper-threshold event corresponds to set of consecutive relative distances.

15. The method of claim 13, wherein determining the lower-threshold events in the historical time-series data further comprises:
    for each data value of the historical time-series greater than the lower threshold, computing a relative distance; and
    forming a lower-threshold event, each lower-threshold event corresponds to set of consecutive relative distances.

16. The method of claim 13, wherein computing a normalized total relative distance further comprises integrating over the relative distances comprising one of an upper-threshold event and a lower-threshold event.

17. The method of claim 13, wherein computing the cumulative distribution for the current data further comprises:
    determining one of an upper-threshold event and a lower-threshold event in the current time-series data;
    computing a total relative distance of one of the upper-threshold event and the lower-threshold event;
    normalizing the total relative distance based on the event counts of the event; and
    computing a value for the cumulative distribution based on the normalized total relative distance of the event, the value is the degree of abnormality of the current time-series data.

18. A non-transitory computer-readable medium encoded with machine-readable instructions that implement a method carried out by one or more processors of a computer system to perform operations comprising:
    retrieving historical time-series data that represents one of past behavior, performance, and usage of the virtual machine from a data-storage device;
    retrieving current time-series data that represents one of current behavior, performance, and usage of the virtual machine from a data-storage device;
    determining upper-threshold events and lower-threshold event in the historical time-series data;
    for each upper and lower threshold event,
        computing a normalized total relative distance,
        computing a median of the normalized total relative distances, and computing a mean of the normalized total relative distances;

computing one of an upper-threshold cumulative distribution and lower-threshold cumulative distribution for the current time-series data based on the median and mean of the normalized total relative distance, the cumulative distribution is the estimate of the degree of abnormality; and displaying an alert on a visual display screen in response to the cumulative distribution of the current upper-threshold event or the current lower-threshold event being greater than a threshold, the alert indicating an out-of-control process of the virtual machine.

19. The computer-readable medium of claim 18, wherein determining the upper-threshold events in the historical time-series data further comprises:

for each data value of the historical time-series greater than the upper threshold, computing a relative distance; and forming an upper-threshold event, each upper-threshold event corresponds to set of consecutive relative distances.

20. The computer-readable medium of claim 18, wherein determining the lower-threshold events in the historical time-series data further comprises:

for each data value of the historical time-series greater than the lower threshold, computing a relative distance; and forming a lower-threshold event, each lower-threshold event corresponds to set of consecutive relative distances.

21. The computer-readable medium of claim 18, wherein computing a normalized total relative distance further comprises integrating over the relative distances comprising one of an upper-threshold event and a lower-threshold event.

22. The computer-readable medium of claim 18, wherein computing the cumulative distribution for the current data further comprises:

determining one of an upper-threshold event and a lower-threshold event in the current time-series data;

computing a total relative distance of one of the upper-threshold event and the lower-threshold event;

normalizing the total relative distance based on the event counts of the event; and computing a value for the cumulative distribution based on the normalized total relative distance of the event, the value is the degree of abnormality of the current time-series data.

\* \* \* \* \*